United States Patent
Wu et al.

(10) Patent No.: US 12,538,343 B2
(45) Date of Patent: Jan. 27, 2026

(54) COMMUNICATION BASED ON RADIO SIGNAL MEASUREMENTS

(71) Applicant: QUALCOMM Incorporated, San Diego, CA (US)

(72) Inventors: Zhibin Wu, Sunnyvale, CA (US); Sudhir Kumar Baghel, Hillsborough, NJ (US); Kapil Gulati, Hillsborough, NJ (US); Arjun Bharadwaj, Poway, CA (US); Hong Cheng, Bridgewater, NJ (US); Shailesh Patil, San Diego, CA (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 433 days.

(21) Appl. No.: 16/581,699

(22) Filed: Sep. 24, 2019

(65) Prior Publication Data
US 2020/0100255 A1    Mar. 26, 2020

Related U.S. Application Data

(60) Provisional application No. 62/737,081, filed on Sep. 26, 2018.

(51) Int. Cl.
H04W 72/542    (2023.01)
H04L 1/1867    (2023.01)
H04W 4/02      (2018.01)

(52) U.S. Cl.
CPC ......... *H04W 72/542* (2023.01); *H04L 1/1893* (2013.01); *H04W 4/023* (2013.01)

(58) Field of Classification Search
CPC ........... H04W 72/0446; H04W 72/042; H04W 24/10; H04W 72/1221; H04W 72/085;
(Continued)

(56) References Cited

U.S. PATENT DOCUMENTS 7,089,264 B1    8/2006  Guido et al.
9,363,782 B2    6/2016  Tenny
(Continued)

FOREIGN PATENT DOCUMENTS

CN    102754459 A    10/2012
CN    104661177 A    5/2015
(Continued)

OTHER PUBLICATIONS

Kondo T., et al., "A Design and Evaluation of a Geolocation-Aware Reliable Multi cast System on Wireless Networks", Applications and the Internet (SAINT) 2011 IEEE/IPSJ 11th International Symposium on, IEEE, Jul. 18, 2011, pp. 408-413, XP032047114, DOI: 10.1109/SAINT.2011.77, ISBN: 978-1-4577-0531-1, section III, figures 3-6.
(Continued)

*Primary Examiner* — Charles C Jiang
*Assistant Examiner* — Ryan C Kavleski
(74) *Attorney, Agent, or Firm* — Procopio, Cory, Hargreaves & Savitch LLP/QUALCOMM Incorporated

(57) ABSTRACT

A method, a computer-readable medium, and an apparatus may include a receiving UE that is configured to receive at least a portion of a message for a service group, measure a signal strength for the message received, and determine whether to send feedback based on the signal strength measured for the message. In some aspects, a transmitting UE is configured to determine an intended range for a service group, and transmit a message for the service group based, at least in part, on the intended range. In some aspects, the transmitting UE is configured to receive HARQ feedback from at least one receiving UE, measure a signal strength for the HARQ feedback, and determine whether to resend the message based on the signal strength measured for the HARQ feedback.

90 Claims, 14 Drawing Sheets

(58) Field of Classification Search
CPC ..... H04W 4/023; H04W 76/14; H04W 88/04; H04W 72/542; H04L 1/1893; H04L 1/1692
See application file for complete search history.

(56) References Cited

U.S. PATENT DOCUMENTS

| | | | |
|---|---|---|---|
| 9,961,487 | B1 | 5/2018 | Miao |
| 10,694,460 | B2 | 6/2020 | Ingale et al. |
| 11,563,528 | B2 | 1/2023 | Ryu et al. |
| 2011/0305158 | A1 | 12/2011 | Kim et al. |
| 2014/0105121 | A1 | 4/2014 | Jose et al. |
| 2015/0011230 | A1 | 1/2015 | Noh et al. |
| 2015/0045061 | A1 | 2/2015 | Da |
| 2015/0327201 | A1 | 11/2015 | He et al. |
| 2016/0056940 | A1 | 2/2016 | Chae et al. |
| 2016/0302137 | A1 | 10/2016 | Escott et al. |
| 2016/0323923 | A1 | 11/2016 | Wei |
| 2016/0337935 | A1* | 11/2016 | Patil ............... H04L 5/0048 |
| 2016/0338095 | A1 | 11/2016 | Faurie et al. |
| 2017/0048922 | A1 | 2/2017 | Lee et al. |
| 2017/0134080 | A1 | 5/2017 | Rahman et al. |
| 2017/0150314 | A1* | 5/2017 | Hwang ............... H04W 4/06 |
| 2017/0195163 | A1 | 7/2017 | Chae et al. |
| 2018/0054693 | A1 | 2/2018 | Agiwal et al. |
| 2018/0115911 | A1 | 4/2018 | Huang et al. |
| 2018/0124574 | A1 | 5/2018 | Byun et al. |
| 2018/0124771 | A1 | 5/2018 | Mok et al. |
| 2018/0139724 | A1 | 5/2018 | Loehr et al. |
| 2018/0152927 | A1* | 5/2018 | Kim ............... H04L 5/0073 |
| 2018/0213382 | A1 | 7/2018 | Tabet et al. |
| 2018/0254820 | A1 | 9/2018 | Chae et al. |
| 2018/0270022 | A1 | 9/2018 | Sun et al. |
| 2018/0367261 | A1 | 12/2018 | Gonzalves et al. |
| 2019/0007974 | A1 | 1/2019 | Nguyen |
| 2019/0044667 | A1 | 2/2019 | Guo et al. |
| 2019/0052436 | A1 | 2/2019 | Desai et al. |
| 2019/0053194 | A1 | 2/2019 | Wei et al. |
| 2019/0053204 | A1 | 2/2019 | Lien et al. |
| 2019/0059071 | A1 | 2/2019 | Khoryaev et al. |
| 2019/0075447 | A1 | 3/2019 | Lee et al. |
| 2019/0090250 | A1 | 3/2019 | Lee et al. |
| 2019/0116475 | A1 | 4/2019 | Lee et al. |
| 2019/0158993 | A1 | 5/2019 | Kwon |
| 2019/0174271 | A1 | 6/2019 | Fujishiro et al. |
| 2019/0174479 | A1 | 6/2019 | Yamazaki et al. |
| 2019/0320358 | A1 | 10/2019 | Knapp |
| 2019/0335532 | A1 | 10/2019 | Kim et al. |
| 2019/0364402 | A1 | 11/2019 | Lee |
| 2019/0394786 | A1 | 12/2019 | Parron et al. |
| 2020/0029318 | A1 | 1/2020 | Guo |
| 2020/0040867 | A1 | 2/2020 | Leege et al. |
| 2020/0092685 | A1* | 3/2020 | Fehrenbach ............ H04W 72/23 |
| 2020/0099476 | A1 | 3/2020 | Park |
| 2020/0100048 | A1 | 3/2020 | Wu et al. |
| 2020/0100167 | A1 | 3/2020 | Cheng et al. |
| 2020/0106566 | A1 | 4/2020 | Yeo et al. |
| 2020/0162864 | A1* | 5/2020 | Lee ............... H04L 1/1671 |
| 2020/0178290 | A1 | 6/2020 | Lee et al. |
| 2020/0196279 | A1 | 6/2020 | Thomas et al. |
| 2020/0228951 | A1 | 7/2020 | Chun et al. |
| 2020/0260214 | A1 | 8/2020 | Wu |
| 2020/0296796 | A1 | 9/2020 | Uchiyama et al. |
| 2020/0323023 | A1 | 10/2020 | Miao |
| 2020/0351033 | A1 | 11/2020 | Ryu et al. |
| 2021/0068071 | A1 | 3/2021 | Wu et al. |
| 2021/0112445 | A1 | 4/2021 | Wu et al. |
| 2021/0168648 | A1* | 6/2021 | Lee ............... H04W 4/40 |
| 2021/0203453 | A1 | 7/2021 | Kim |
| 2021/0235246 | A1 | 7/2021 | Hovey et al. |
| 2021/0242975 | A1 | 8/2021 | Kim et al. |
| 2021/0266212 | A1* | 8/2021 | Chae ............... H04W 56/0045 |
| 2021/0266921 | A1 | 8/2021 | Wang et al. |
| 2021/0314126 | A1* | 10/2021 | Bae ............... H04W 72/14 |
| 2021/0351877 | A1 | 11/2021 | Xu et al. |
| 2022/0190966 | A1 | 6/2022 | Hosseini et al. |
| 2022/0393834 | A1 | 12/2022 | Thomas |
| 2023/0102142 | A1 | 3/2023 | Kim et al. |
| 2023/0292397 | A1 | 9/2023 | Kung et al. |
| 2025/0168590 | A1 | 5/2025 | Wu et al. |

FOREIGN PATENT DOCUMENTS

| | | | |
|---|---|---|---|
| CN | 116366221 A | 6/2023 | |
| EP | 3644644 A1 | 4/2020 | |
| WO | 2012178016 A1 | 12/2012 | |
| WO | 2014062459 A1 | 4/2014 | |
| WO | 2017103662 A1 | 6/2017 | |
| WO | 2017146534 A1 | 8/2017 | |
| WO | 2017155320 A1 | 9/2017 | |
| WO | 2018084608 A2 | 5/2018 | |
| WO | 2018125686 A2 | 7/2018 | |
| WO | WO-2020033089 A1 * | 2/2020 | ........... H04L 1/1819 |
| WO | WO-2020064304 A1 * | 4/2020 | |
| WO | 2021091089 A1 | 5/2021 | |
| WO | 2021141408 A1 | 7/2021 | |

OTHER PUBLICATIONS

Park., "Foreign Priority Application KR1020180114042 Data", Sep. 21, 2018, KT Corporation, 91 Pages.
Partial International Search Report—PCT/US2019/052875—ISA/EPO—dated Jan. 2, 2020.
International Search Report and Written Opinion—PCT/US2019/052875—ISAEPO—dated Apr. 8, 2020.
Oppo., et al., "Correction for Zoning", R2-1811097, 3GPP TSG-RAN WG2 Meeting#103, Gothenburg, Sweden, Aug. 20-24, 2018, 6 Pages.
Oppo., et al., "Correction for Zoning", R2-1813185, 3GPP TSG-RAN WG2 Meeting#103, Gothenburg, Sweden, Aug. 20-24, 2018, 7 Pages.
One2One, et al., "Proposed Version 2 of TR 21.905, 3GPP Vocabulary", 3GPP TSG SA S1#7, S1-000091, Sofia Antipolis, Feb. 9-11, 2000, 33 Pages.
Taiwan Search Report—TW112140105—TIPO—Aug. 1, 2024.
European Search Report—EP25162278—Search Authority—The Hague—Jun. 18, 2025.

* cited by examiner

COMMUNICATION BASED ON RADIO SIGNAL MEASUREMENTS

CROSS REFERENCE TO RELATED APPLICATION(S)

This application claims the benefit of U.S. Provisional Application Ser. No. 62/737,081, entitled "Communication Based on Radio Signal Measurements" and filed on Sep. 26, 2018, which is expressly incorporated by reference herein in its entirety.

INTRODUCTION

The present disclosure relates generally to communication systems, and more particularly, to vehicle-to-everything (V2X) communication, vehicle-to-vehicle (V2V), or other device-to-device (D2D) communication.

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. Some communication may be performed directly between User Equipment (UEs). Examples of such communication include D2D communication, V2X communication, V2V communication, etc. There exists a need for further improvements in wireless communication between UEs. These improvements may also be applicable to other wireless communication technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method is provided for wireless communication at a receiving device. The method includes receiving, from a transmitting device, at least a portion of a message for a service group, wherein the message comprises a D2D message and measuring a signal strength for the message received from the transmitting device. The method includes determining whether the receiving device is within a range of the transmitting device based on the measured signal strength for the message and determining to send feedback to the transmitting device when the receiving device is within the range of the transmitting device.

In another aspect of the disclosure, an apparatus is provided for wireless communication at a receiving device. The apparatus may include a memory and at least one processor coupled to the memory. The memory and the at least one processor may be configured to receive, from a transmitting device, at least a portion of a message for a service group, wherein the message comprises a D2D message; measure a signal strength for the received message received from the transmitting device; determine whether the receiving device is within a range of the transmitting device based on the measured signal strength for the received message; and determine to send feedback to the transmitting device when the receiving device is within the range of the transmitting device.

In another aspect of the disclosure, an apparatus is provided for wireless communication at a receiving device. The apparatus includes means for receiving, from a transmitting device, at least a portion of a message for a service group, wherein the message comprises a D2D message and means for measuring a signal strength for the received message received from the transmitting device. The apparatus includes means for determining whether the receiving device is within a range of the transmitting device based on the measured signal strength for the received message and means for determining to send feedback to the transmitting device when the receiving device is within the range of the transmitting device.

In another aspect of the disclosure, a computer-readable medium is provided for wireless communication at a receiving device. The computer-readable medium stores computer executable code for wireless communication at a receiving device, the code when executed by a processor cause the processor to receive, from a transmitting device, at least a portion of a message for a service group, wherein the message comprises a D2D message, measure a signal strength for the received message received from the transmitting device, determine whether the receiving device is within a range of the transmitting device based on the measured signal strength for the received message, and determine to send feedback to the transmitting device when the receiving device is within the range of the transmitting device.

In another aspect of the disclosure, a method is provided for wireless communication at a transmitting device. The method includes determining an intended range for a service group and transmitting a message for the service group based, at least in part, on the intended range, wherein the message comprises a D2D message. The method includes providing a parameter for a signal strength threshold associated with the service group.

In another aspect of the disclosure, an apparatus is provided for wireless communication at a transmitting device. The apparatus includes a memory and at least one processor, the memory and at least one processor configured to determine an intended range for a service group and transmit a message for the service group based, at least in part, on the intended range, wherein the message comprises a D2D message. The memory and processor are configured to provide a parameter for a signal strength threshold associated with the service group In another aspect of the disclosure, an apparatus is provided for wireless communication at a transmitting device. The apparatus includes means for determining an intended range for a service group and means for transmitting a message for the service group based, at least in part, on the intended range, wherein the message comprises a D2D message. The apparatus includes means for providing a parameter for a signal strength threshold associated with the service group.

In another aspect of the disclosure, a computer-readable medium is provided for wireless communication at a transmitting device. The computer-readable medium stores computer executable code that, when executed by a processor, cause the processor to determine an intended range for a service group, transmit a message for the service group based, at least in part, on the intended range, wherein the message comprises a D2D message, and provide a parameter for a signal strength threshold associated with the service group.

In another aspect of the disclosure, a method is provided for wireless communication at a transmitting device. The method includes transmitting a message to a service group for an intended range, wherein the message comprises a D2D message and receiving Hybrid Automatic Repeat Request (HARQ) feedback from at least one receiving device. The method includes measuring a signal strength for the HARQ feedback and determining whether the HARQ feedback is from a receiving device within the intended range based on the signal strength measured for the HARQ feedback. The method includes determining to resend the message when the HARQ feedback is from the receiving device within the intended range.

In another aspect of the disclosure, an apparatus is provided for wireless communication at a transmitting device. The apparatus includes a memory and at least one processor, the memory and at least one processor configured to transmit a message to a service group for an intended range, wherein the message comprises a D2D message and receive HARQ feedback from at least one receiving device. The memory and processor are configured to measure a signal strength for the HARQ feedback and determine whether the HARQ feedback is from a receiving device within the intended range based on the signal strength measured for the HARQ feedback. The memory and processor are configured to determine to resend the message when the HARQ feedback is from the receiving device within the intended range.

In another aspect of the disclosure, an apparatus is provided for wireless communication at a transmitting device. The apparatus includes means for transmitting a message to a service group for an intended range, wherein the message comprises a D2D message. The apparatus includes means for receiving HARQ feedback from at least one receiving device and means for measuring a signal strength for the HARQ feedback. The apparatus includes means for determining whether the HARQ feedback is from a receiving device within the intended range based on the signal strength measured for the HARQ feedback and means for determining to resend the message when the HARQ feedback is from the receiving device within the intended range.

In another aspect of the disclosure, a computer-readable medium is provided for wireless communication at a transmitting device. The computer-readable medium stores computer executable code that, when executed by a processor, cause the processor to transmit a message to a service group for an intended range, wherein the message comprises a D2D message, receive HARQ feedback from at least one receiving device, measure a signal strength for the HARQ feedback, determine whether the HARQ feedback is from a receiving device within the intended range based on the signal strength measured for the HARQ feedback, and determine to resend the message when the HARQ feedback is from the receiving device within the intended range.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
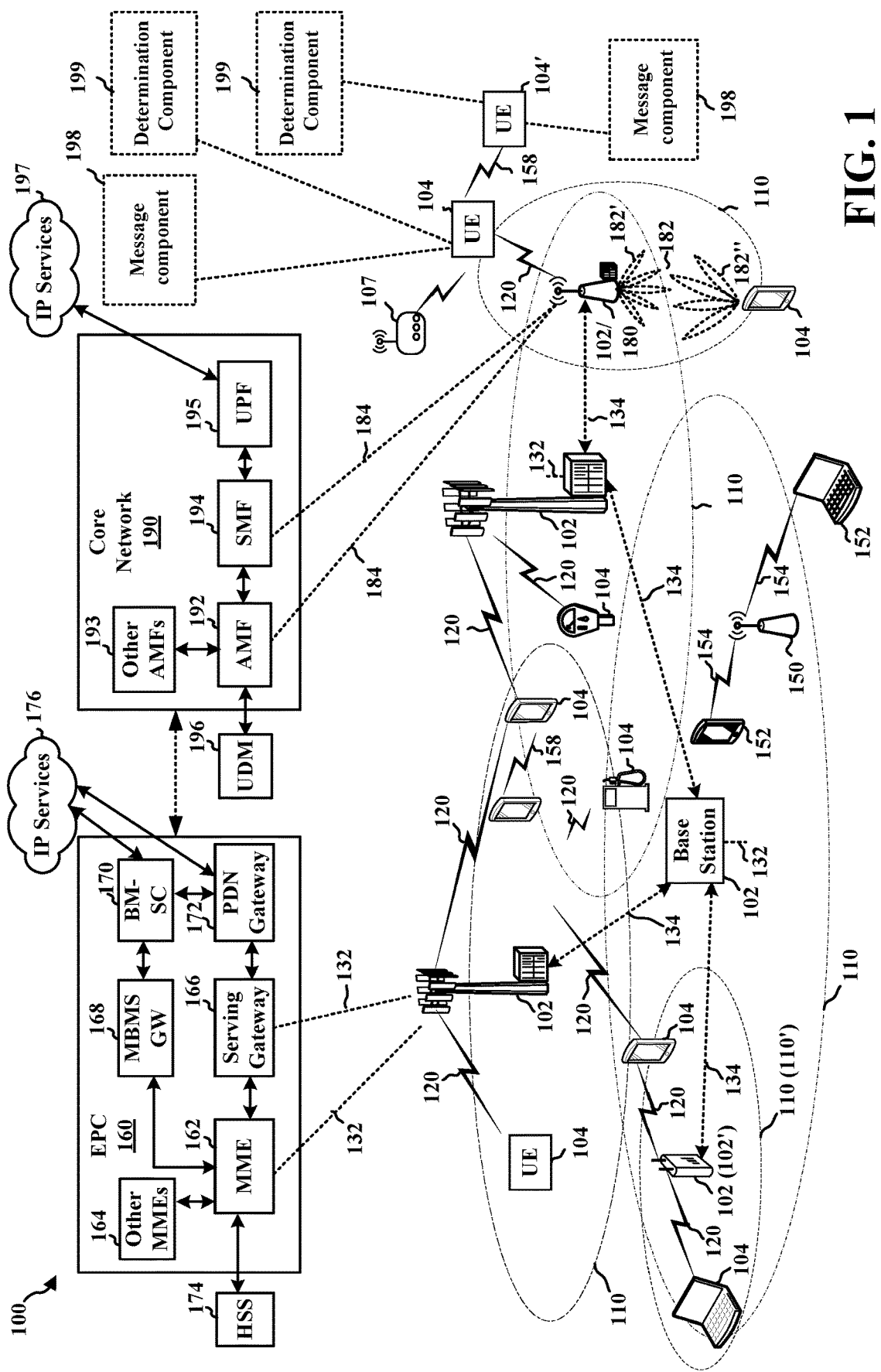
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Wireless communication may involve transmissions from a transmitting device for receipt by at least one receiving device. For example, a transmitting device may transmit a message via V2V/V2X/D2D to a receiving vehicle. The message may be multicast from the transmitting device and may be intended to be reliably delivered to certain receiving devices, e.g., devices for a corresponding service group, within a certain area including the transmitting device. In order to ensure that the message is reliably received by the receiving device(s), the transmitting device may listen for feedback from receiving devices(s) to determine whether the message was received correctly. Receiving device(s) that do not successfully receive the message may respond to the transmitting device with a Negative Acknowledgement (NACK). The NACK may prompt the transmitting device to retransmit the message. However, a receiving device that is too distant from the transmitting device to correctly receive the message may respond with a NACK causing the transmitting device to retransmit the message in vain. Such feedback and wasted retransmissions for receiving devices that may be distant from the transmitting device degrade system performance. This problem may be especially challenging in a V2X/V2V/D2D environment due to the highly mobile nature of transmitters and/or receivers.

Aspects presented herein provide solutions in which feedback can be limited from receivers that are distant from the transmitting device. For example, aspects may include the receiving device determining whether it is an intended receiver of the message and/or whether it should provide feedback for the message based on a measured signal strength of the received message. Additional aspects enable the transmitting device to limit undesirable retransmissions when feedback is received from a receiving device at an undesirable distance from the transmitting device. For example, a transmitting device may determine whether to retransmit a message based on a measured signal strength of received negative feedback. Aspects may help to reduce system degradation due to retransmissions to distant receiving devices, and therefore, may improve the efficient use of wireless resources. Aspects may also help to avoid reception of feedback from unintended receiving devices that are a part of a service group yet are not proximate to a transmitting device.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more examples, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160 and another core network 190 (such as a 5G Core (5GC)). The base stations 102 may include macro cells (high power cellular base station) and/or small cells (low power cellular base station). The macro cells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (that may be referred to as gNodeBs (gNBs) and collectively referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly with each other over backhaul links 134 (e.g., X2 interface), or indirectly with each other through the EPC 160 or 5GC 190. The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more base stations 102, e.g., macro base stations. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNB, or other type of base station. Some base stations 180, such as a gNB, may operate in a traditional sub 6 GHz spectrum, in millimeter wave (mmW) frequencies, and/or near mmW frequencies in communication with the UE 104. When the base station 180 operates in mmW or near mmW frequencies, the base station 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station, e.g., base station 180, may utilize beamforming 182 with the UE 104 to compensate for the extremely high path loss and short range.

Devices may use beamforming to transmit and receive communication. For example, FIG. 1 illustrates that a base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same. Although beamformed signals are illustrated between UE 104 and base station 102/180, aspects of beamforming may similarly be applied by UE 104 or RSU 107 to communicate with another UE 104 or road side unit (RSU) 107, such as based on V2X, V2V, or other D2D communication.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The Core Network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the Core Network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may comprise or be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or Core Network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Some wireless communication networks may include vehicle-based communication devices that can communicate from vehicle-to-vehicle (V2V), vehicle-to-infrastructure (V2I) (e.g., from the vehicle-based communication device to road infrastructure nodes such as a RSU), vehicle-to-network (V2N) (e.g., from the vehicle-based communication device to one or more network nodes, such as a base station), and/or a combination thereof and/or with other devices, which can be collectively referred to as vehicle-to-anything (V2X) communications. Referring again to FIG. 1, in certain aspects, a UE 104, e.g., a transmitting Vehicle User Equipment (VUE) or other UE, may be configured to transmit messages directly to another UE 104. The communication may be based on V2V/V2X/V2I or other D2D communication, such as Proximity Services (ProSe), etc. Communication based on V2V, V2X, V2I, and/or other D2D may also be transmitted and received by other transmitting and receiving devices, such as RSU 107, etc. Aspects of the communication may be based on communication across the PC5 interface or sidelink communication e.g., as described in connection with the example in FIG. 2. Although the following description may provide examples for V2X/D2D communication in connection with 5G NR, the concepts described herein may be applicable to other similar areas, such as LTE, LTE-A, CDMA, GSM, and other wireless technologies.

Referring again to FIG. 1, in certain aspects, a UE 104, such as a transmitting Vehicle User Equipment (VUE) or other UE, may be configured to transmit messages directly to another UE 104'. The communication may be based on V2V/V2X or other D2D communication, such as Proximity Services (ProSe). Aspects presented herein provide a way for communication between the devices, e.g., engaged in PC5 based communication or other D2D communication, to have improved reliability while avoiding inefficient use of resources to retransmit to receivers at an undesirable distance. For example, the transmitting device, whether a UE, RSU, or base station, may comprise a message component 198 that is configured to generate a message for a service group. The UE 104 may be configured to determine an intended range for a service group, and transmit the message for the service group based, at least in part, on the intended range. A receiving UE (e.g., UE 104') may be configured to receive, from the transmitting UE (e.g., UE 104), at least a portion of the message for the service group, and measure a signal strength for the message received from UE 104. The UE 104' may include a determination component 199 configured to determine whether to send feedback to UE 104 based on the signal strength measured for the message. In some aspects, the message component 198 of UE 104 may be configured to receive HARQ feedback from at least the UE 104', measure a signal strength for the HARQ feedback, and determine whether to resend the message based on the signal strength measured for the HARQ feedback.

Figure 2:
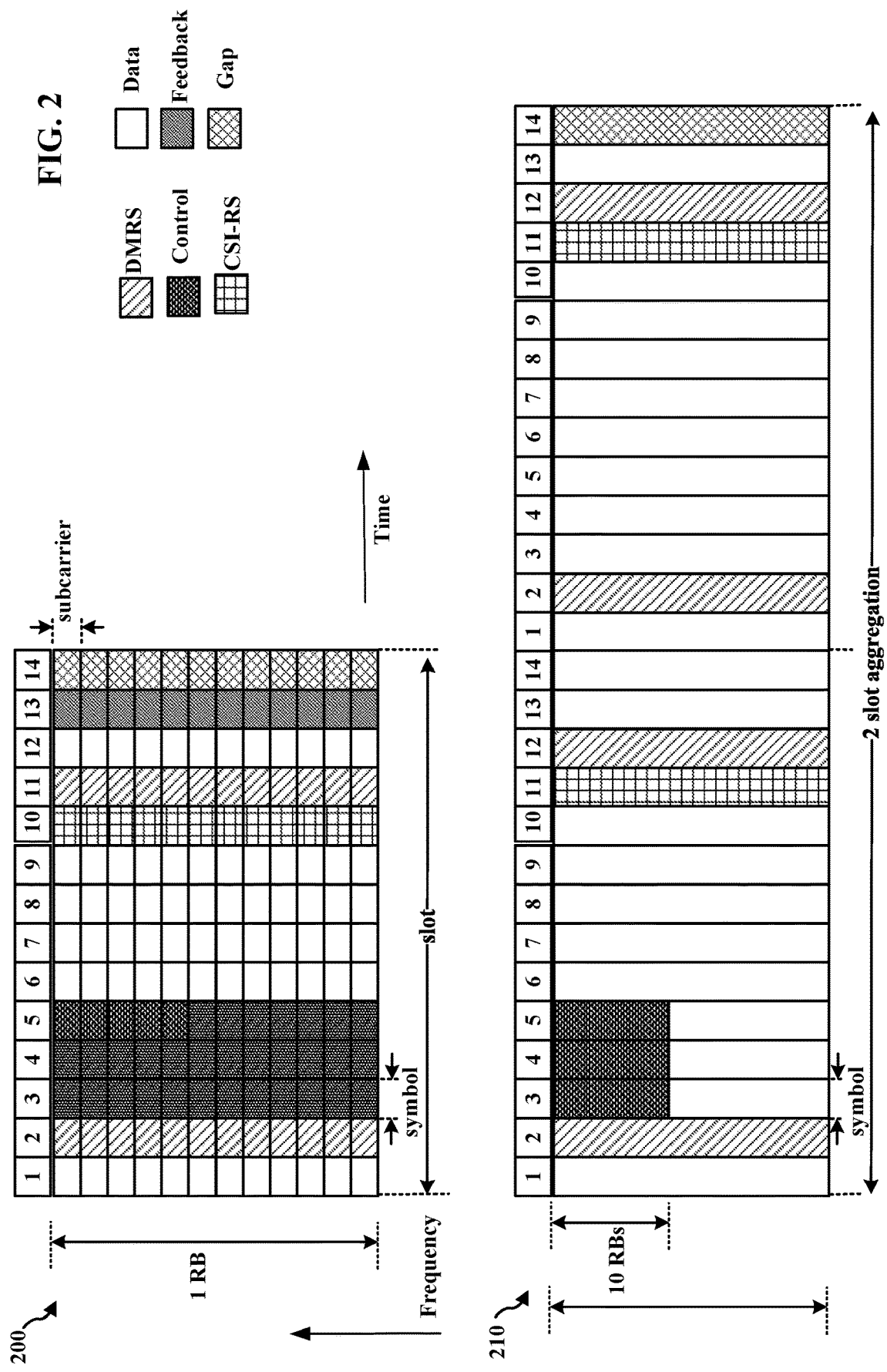
FIG. 2 illustrates an example of a sidelink slot structure.

FIG. 2 illustrates example diagrams 200 and 210 illustrating examples slot structures that may be used for wireless communication between UE 104 and UE 104, e.g., for sidelink communication. The slot structure may be within a 5G/NR frame structure. Although the following description may be focused on 5G NR, the concepts described herein may be applicable to other similar areas, such as LTE, LTE-A, CDMA, GSM, and other wireless technologies. This is merely one example, and other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. Diagram 200 illustrates a single slot transmission, e.g., which may correspond to a 0.5 ms transmission time interval (TTI). Diagram 210 illustrates an example two-slot aggregation, e.g., an aggregation of two 0.5 ms TTIs. Diagram 200 illustrates a single RB, whereas diagram 210 illustrates N RBs. In diagram 210, 10 RBs being used for control is merely one example. The number of RBs may differ.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 2, some of the REs may comprise control information, e.g., along with demodulation RS (DMRS). In some aspects, the control information may indicate an intended range for corresponding data. The intended range may help devices receiving the data to determine whether to provide feedback to the device that transmitted the data. FIG. 2 also illustrates that symbol(s) may comprise CSI-RS. The symbols in FIG. 2 that are indicated for DMRS or CSI-RS indicate that the symbol comprises DMRS or CSI-RS REs. Such symbols may also comprise REs that include data. For example, if a number of ports for DMRS or CSI-RS is 1 and a comb-2 pattern is used for DMRS/CSI-RS, then half of the REs may comprise the RS and the other half of the REs may comprise data. A CSI-RS resource may start at any symbol of a slot, and may occupy 1, 2, or 4 symbols depending on a configured number of ports. CSI-RS can be periodic, semi-persistent, or aperiodic (e.g., based on DCI triggering). For time/frequency tracking, CSI-RS may be either periodic or aperiodic. CSI-RS may be transmitted in bursts of two or four symbols that are spread across one or two slots. The control information may comprise Sidelink Control Information (SCI). At least one symbol may be used for feedback, as described herein. A symbol prior to and/or after the feedback may be used for turnaround between reception of data and transmission of the feedback. Although symbol 12 is illustrated for data, it may instead be a gap symbol to enable turnaround for feedback in symbol 13. Another symbol, e.g., at the end of the slot may be used as a gap. The gap enables a device to switch from operating as a transmitting device to prepare to operate as a receiving device, e.g., in the following slot. Data may be transmitted in the remaining REs, as illustrated. The data may comprise the data message described herein. The position of any of the SCI, feedback, and LBT symbols may be different than the example illustrated in FIG. 2. Multiple slots may be aggregated together. FIG. 2 also illustrates an example aggregation of two slots. The aggregated number of slots may also be larger than two. When slots are aggregated, the symbols used for feedback and/or a gap symbol may be different that for a single slot. While feedback is not illustrated for the aggregated example, symbol(s) in a multiple slot aggregation may also be allocated for feedback, as illustrated in the one slot example.

Figure 3:
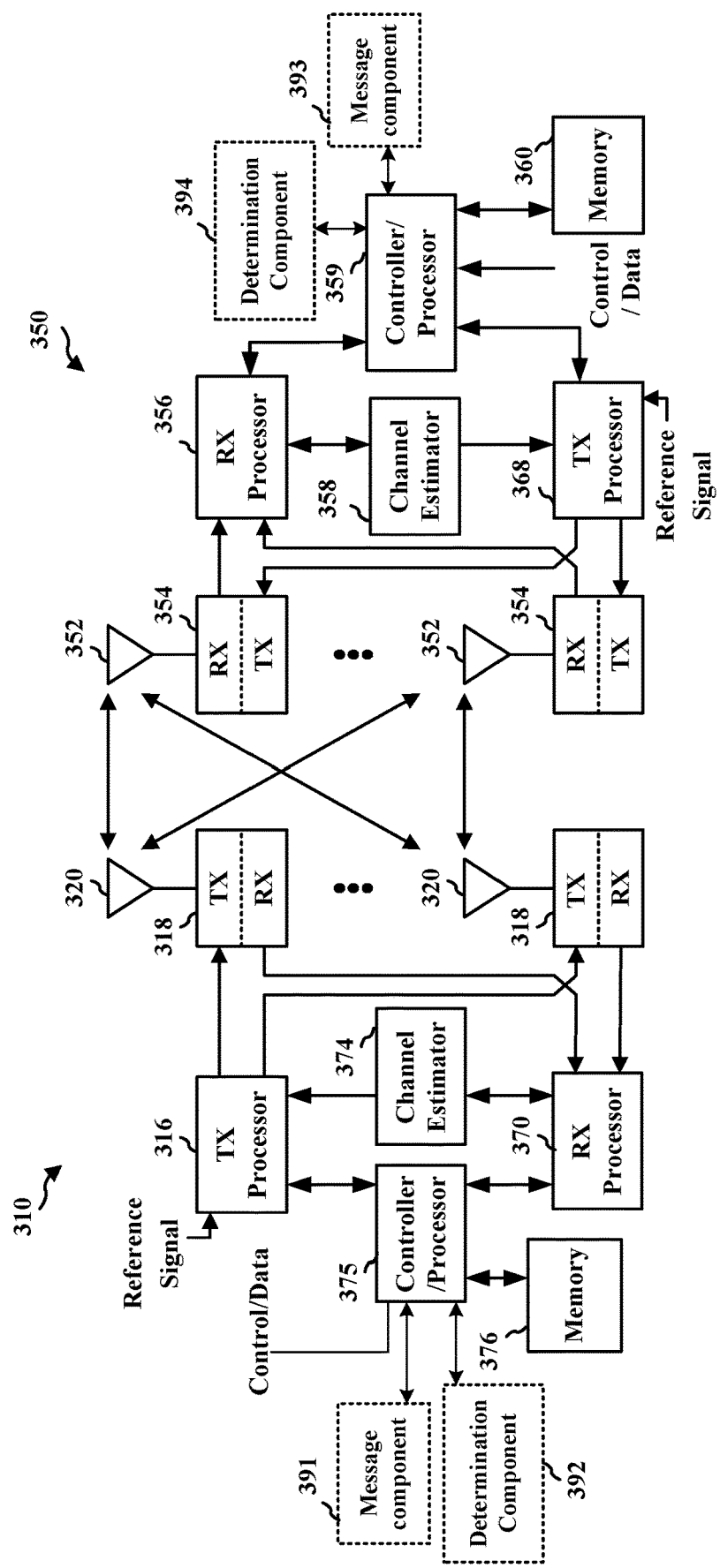
FIG. 3 is a diagram illustrating an example of a base station and user equipment (UE) in an access network.

FIG. 3 is a block diagram 300 of a first wireless communication device 310 in communication with a second wireless communication device 350, e.g., via V2V/V2X/D2D communication. The device 310 may comprise a transmitting device communicating with a receiving device, e.g., device 350, via V2V/V2X/D2D communication. The communication may be based, e.g., on sidelink. The first wireless communication device 310 may comprise a UE, an RSU, etc. The receiving device may comprise a UE, an RSU, etc. In addition to the other components illustrated in FIG. 3, the wireless communication devices 310, 350 may each comprise a message component 391, 393 and/or a determination component 392, 394. The message component 391, 393 may be configured to generate and transmit a message for the service group based, at least in part, on the intended range. The message component 391, 393 may also be configured to determine whether to retransmit a message based on a signal strength of feedback received from receiving device(s). The determination component 392, 394 may be configured to determine whether to send a feedback for the message based on a signal strength of at least a portion of the message. As an example, least one of the TX processor 368, the RX processor 356, or the controller/processor 359 of device 350 or the TX processor 316, the RX processor 370, or the controller/processor 375 may be configured to perform aspects described in connection with 198 and/or 199 of FIG. 1.

Packets may be provided to a controller/processor 375 that implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the device 350. Each spatial stream may then be provided to a different antenna 320 via a separate transmitter 318TX. Each transmitter 318TX may modulate an RF carrier with a respective spatial stream for transmission.

At the device 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the device 350. If multiple spatial streams are destined for the device 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by device 310. These soft decisions may be based on channel estimates computed by the channel estimator 358. The soft decisions are then decoded and deinterleaved to recover the data and control signals that were originally transmitted by device 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. The controller/processor 359 may provide demultiplexing between transport and logical channels, packet reassembly, deciphering, header decompression, and control signal processing. The controller/processor 359 is also responsible for error detection using an ACK and/or NACK protocol to support HARQ operations.

Similar to the functionality described in connection with the transmission by device 310, the controller/processor 359 may provide RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by device 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The transmission is processed at the device 310 in a manner similar to that described in connection with the receiver function at the device 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. The controller/processor 375 provides demultiplexing between transport and logical channels, packet reassembly, deciphering, header decompression, control signal processing. The controller/processor 375 is also responsible for error detection using an ACK and/or NACK protocol to support HARQ operations.

Wireless communication may include multicast or broadcast communication directly between UEs. As an example, multicast sidelink communication may be performed via a PC5 interface. UEs may communicate using sidelink multicast or broadcast based on V2X communication, V2V communication, or other D2D communication, for example. A multicast may involve a transmission from one UE that is intended to be decoded by UEs that are part of a service group. A service group may comprise one or more UEs. A group ID identifying the service group may be comprised in the message, e.g., in Sidelink Control Information (SCI) of the multicast message, and/or as part of the MAC layer destination address.

Figure 4:
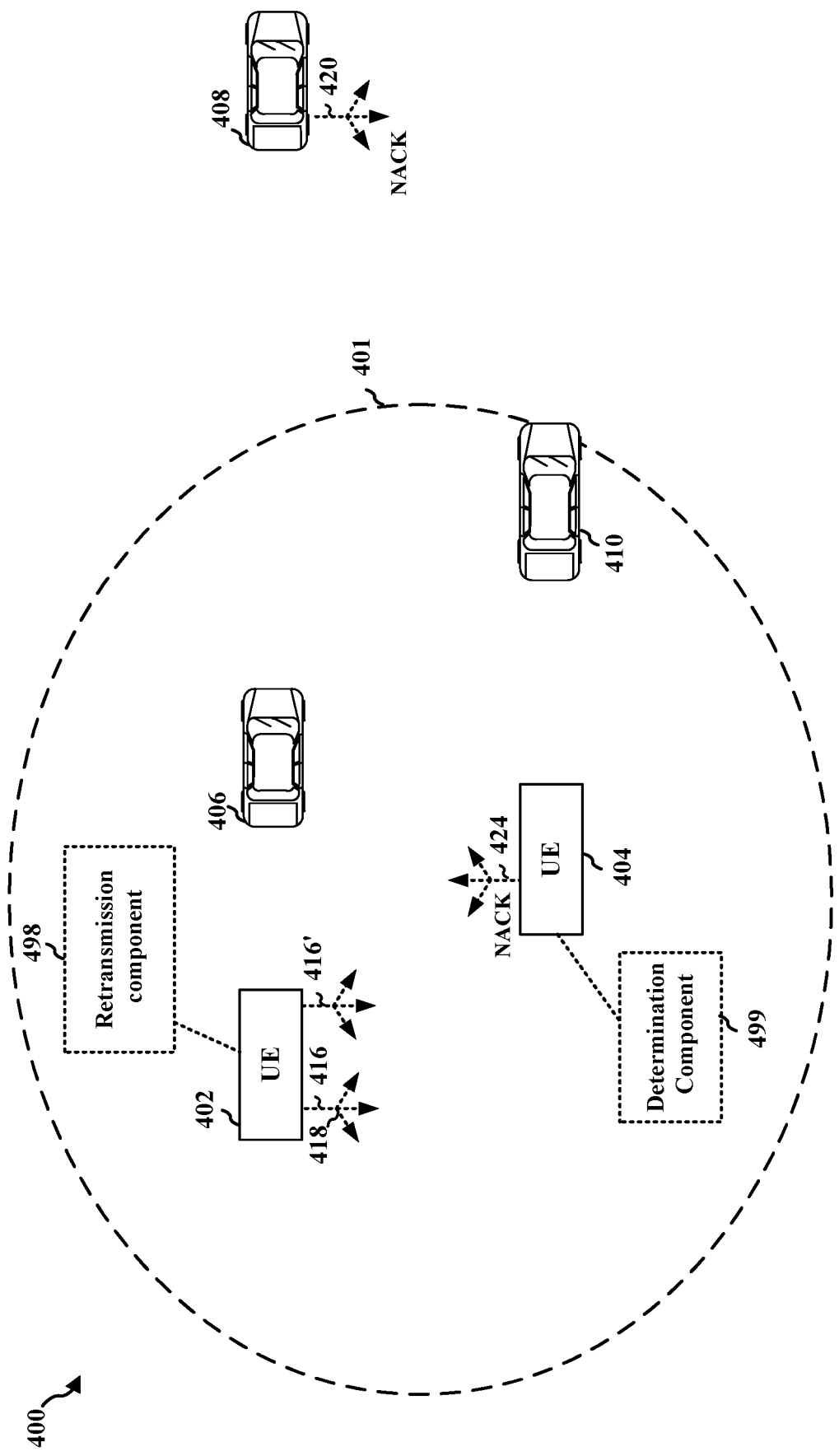
FIG. 4 illustrates an example of signaling between UEs.

FIG. 4 illustrates an example of communication 400 between multiple UEs, e.g., based on V2X/V2V/other D2D communication. In some examples, a transmitting UE 402 may be a vehicle or a device installed in a vehicle as part a V2V/V2X network, e.g., based on 5G/NR communication or LTE communication. In some examples, the transmitting UE 402 may be a UE that is not associated with a vehicle. Such V2V/V2X/other D2D communication may involve the transmission of information from the transmitting UE 402 to another receiving UE, e.g., any of 404, 406, 408, 410. For example, the communication from the transmitting UE 402 may be directed to a service group of RX UEs, e.g., a subset from among receiving UEs 404, 406, 408, 410. While the example illustrates communication between vehicles, the aspects presented herein may also be applicable to any transmitting and/or receiving device engaged in V2X/V2V/ other D2D communication, e.g., based on PC5. The transmitting and/or receiving devices may comprise a UE, such as a vehicle. Aspects may also be applicable to an RSU 107 or a base station 102, 180 communicating as a transmitting device or receiving device based on V2V/V2X or direct D2D communication. Thus, although the aspects of the present application are described using the example of a receiving UE and a transmitting UE, the aspects are applicable to other devices that may be engaged in PC5 communication.

In a PC5 multicast, for example, a transmitting UE 402 may ensure that all intended receivers in the service group and in proximity of the transmitting UE accurately receive the message. If the intended receivers, e.g., in the service group and/or in the proximity of the transmitting UE, do not receive the message accurately, the transmitting UE may retransmit the message in order to ensure accurate receipt of the message.

In order to improve reliability, feedback may be sent back from the receiving UEs in the service group. For example, if a particular UE does not correctly receive the message, the UE may transmit feedback, such as a NACK indicating to the transmitting UE that there was an error in receiving the message. In response to the NACK, the transmitting UE may retransmit the message.

However, negative feedback from distant UEs may cause the transmitting UE 402 to retransmit the message and may degrade the overall system performance. For example, the receiving UE may be at a distance from the transmitting UE 402 such that the receiving UE will not be expected to correctly receive the message. Such retransmissions would degrade overall system performance through an inefficient use of wireless resources and through unnecessary potential interference to other wireless communication.

As an example, UEs 404, 406, and 408 may be associated with the service group. UE 406 may have correctly received the message 416 from UE 402 and may not transmit a NACK. UE 404 may have experienced an error in receiving the message. Thus, UE 404 may transmit a NACK 424 indicating to UE 402 that the message was not accurately received. In response to the NACK 424, the transmitting UE 402 may determine to retransmit the message 416 as retransmission 416'. However, negative feedback, e.g., NACK(s), may be received from far away receivers that are outside the desired proximity of the transmitting UE 402. As illustrated in FIG. 4, the UE may intend for UEs within an intended area/range 401 to receive the message reliably. UE 408 that is outside the intended area/range 401 may receive at least a part of the message 416 and send a NACK 420 to UE 402. However, UE 408 may be at such a distance that UE 408 is unlikely to receive the message 414 correctly even with a retransmission from UE 402. Additionally, based on the service requirement, there may be no need for the UE at the distance of UE 408 to receive the message. Therefore, the message may be irrelevant for UE 408.

While a group ID, e.g., a common destination ID, may be used to identify a multicast service group, in an ad hoc V2X/V2V/D2D environment, it may be difficult to manage or establish a common group identifier that is known to vehicles in the service group that are also in the proximity of the transmitting UE because of the mobile nature of the transmitters and/or receivers. Receiving UEs that are distant from the transmitting UE 402 may be a part of the service group and know the group ID. The distant UEs may attempt to receive the message, regardless of their distance from the message sender.

Aspects are presented that help to limit undesirable feedback from distant UEs and to avoid retransmissions based on such feedback. Aspects enable a receiver to determine whether it is an intended receiver of the message. The receiver can then determine whether to send feedback based on whether or not the receiver is an intended receiver of the message. For example, the receiving UE may avoid sending feedback if the UE is not in the intended area/range 401 for the message. A transmitting UE 402 may be configured to control retransmissions based on a parameter of the received NACK(s). The aspects presented herein may be used independently or may be employed together. The aspects presented herein help to ensure that messages are reliably received within an intended area and in a way that limits feedback and/or retransmissions for UEs at an undesirable distance.

The receiving UE 404, 406, 408, or 410 may filter feedback for a received message (e.g., message 416) based on a measured signal strength for the received message. For example, a determination component 499, as illustrated for UE 404, may determine whether to send feedback for a message based on a measured signal strength for the message. The receiving UE 404, 406, 408, or 410 may receive, from the transmitting UE 402, at least a portion of the message 416 for the service group, measure a signal strength for the portion of the received message, and determine whether to send feedback (e.g., NACK 424) to the transmitting UE 402 based on the measured signal strength for the message. In some aspects, the measured signal strength may include a Received Signal Strength Indicator (RSSI) and/or a Reference Signal Received Power (RSRP). In this way, feedback from distant UEs can be reduced so that the UEs within an intended range of the transmitting UE 402 may send the feedback, thereby increasing the performance and reliability of the overall system.

The signal strength may be measured based on a control portion of the message. The signal strength may be measured based on a data portion of the message. The signal strength may be measured based on both a data portion of the message and a control portion of the message.

The receiving UE 404, 406, 408, or 410 may compare the measured signal strength (e.g., RSSI/RSRP) with a threshold, to determine if the receiving UE is an intended receiver or not, e.g., a receiver within an intended range. The receiving UE may use more than one threshold, e.g., a lower bound and an upper bound, to determine whether the signal strength is within a window of signal strengths. The receiving UE may use a range, e.g., based on the lower bound and the upper bound to determine whether the receiving UE is an intended receiver. In some aspects, the threshold may be based on an intended range for the message. For example, the achieved range/distance by the transmitting UE 402 (e.g., sender) may be linked to a quality of service (QoS) parameter. The QoS parameter may be defined for the type of communication. In an example, the QoS parameter may be for V2X communication. The RSSI/RSRP threshold may be mapped from any of a QoS parameter, a 5G QoS Indicator (5QI), a range for the message, etc. In some aspects, a RSSI/RSRP threshold may be based, at least in part, on a QoS parameter for the service group. For example, the QoS parameter may be a stand-alone range parameter, or may be comprised in a 5QI that includes a range requirement.

The threshold may be configured by the transmitting UE 402. The threshold may be based on a predefined or preconfigured threshold. The receiving UE 404, 406, 408, or 410 may receive an indication 418 of a parameter from the transmitting UE 402, wherein the threshold may be based at least in part on the parameter. In some aspects, the indication 418 of the parameter may be comprised in the message 416. In other aspects, the parameter may be provided to the receiving UE separately from the message 416. As an example, the measured signal strength (e.g., RSSI/RSRP) threshold may be preconfigured based on the QoS parameter associated with a particular group service. For example, in connection with a configuration of the receiving UE to listen to the group ID of the V2X multicast service, the corresponding signal strength threshold for providing feedback for messages of the service group may be also configured. As another example, the measured signal strength threshold may be included in the control information of the V2X message 416 itself. For example, the measured signal strength threshold may be dynamically adjustable. The transmitting UE 402 may adjust the intended range by dynamically adjusting the threshold per transmission.

In some aspects, the message may comprise an Information Element (IE) associated with a group ID information for the service group. In some aspects, the message may comprise an IE that is generated as a hash of group ID information for the service group and the indication of the signal strength threshold parameter. In some aspects, the message may comprise both an IE that is generated as a hash of group ID information for the service group and an IE that contains the indication of the signal strength threshold parameter.

For example, if the transmitting UE 402 is to send a group ID plus a limited set of extra information, the transmitting UE 402 may hash the group ID+extra information into the IE which provides a shorter identifier that can be embedded in the control portion of the message 416. The use of the IE may reduce the overhead burden of the message while providing the group ID information and the additional information for the signal strength parameter used to determine whether to send feedback. For example, the extra information may indicate the RSSI/RSRP threshold. In another example, the extra information may indicate information, e.g., at least one parameter, that can be used by the UE to determine the RSSI/RSSP threshold. In another example, the transmitting UE 402 may hash the group ID into the IE which provides a shorter identifier, and may include both this IE and the extra information in the message 416.

In some aspects, the receiving UE 404, 406, 408, or 410 may determine to send the feedback (e.g., a ACK or a NACK 424) if the signal strength that is measured for the message meets a threshold or is within a range. For example, the receiving UE may transmit negative HARQ feedback (e.g., a NACK) to the transmitting UE 402 if the message 416 is not correctly received and the signal strength of a measured portion of the message meets the threshold signal strength or is within a range of signal strengths. In another example, the receiving UE may transmit positive HARQ feedback (e.g., an ACK) to the transmitting UE 402 if the message is correctly received and the signal strength of a measured portion of the message meets the threshold signal strength or is within a range of signal strengths.

On the other hand, if the receiving UE measures a signal strength for the message that is below the threshold or outside the range, the receiving UE may determine to refrain from sending the feedback to the transmitting UE 402, regardless of whether the packet is received correctly or not. Thus, the UE might not send a NACK even if the message is incorrectly received and might not send an ACK even if the message is correctly received.

The transmitting UE may transmit the message at a transmission power. The receiving UE may use a delta in connection with the transmission power at which the message was transmitted to determine whether the receiving UE is an intended receiver and whether to send feedback. The receiving UE may also use other parameters to determine whether to send feedback. For example, the receiving UE may use parameters received in a control message (e.g., sidelink control information SCI). The receiving UE may use a current interference level of the receiving UE, a channel busy ratio (CBR) of the receiving UE, etc. to determine whether to send feedback.

The transmitting UE 402 may be configured to determine the intended range for the service group and to transmit the message 416 for the service group based, at least in part, on the determined range. For example, the transmitting UE 402 may provide the indication 418 of the parameter for the signal strength threshold associated with the service group. The signal strength threshold may be used by receiving UEs 404, 406, 408, or 410 to determine whether to send the feedback to the message. For example, the indication 418 of the parameter may be comprised in the message 416. By providing the indication, UEs within proximity of the transmitting UE 402 (e.g., with intended area/range 401) may send the feedback, and distant UEs (e.g., outside the intended area/range 401) may avoid sending feedback, thereby increasing the performance and reliability of the overall system.

Alternately or additionally, the transmitting UE 402 may control retransmission attempts based on a signal strength of NACK received from one or more receiving UEs. For example, a retransmission component 498 of the transmitting UE 402 may determine whether to retransmit a message based on a signal strength of the received feedback. In the example in FIG. 4, the transmitting UE 402 may multicast the message 416 to the service group and receive HARQ feedback from at least one receiving UE. The transmitting UE 402 may measure a signal strength for the HARQ feedback, and determine whether to resend the message (e.g., as retransmission 416') based on the measured signal strength for the HARQ feedback. HARQ feedback may be received in a common resource in time and frequency. If more than one receiving UE fails to receive the message 416, more than one UE may send negative HARQ feedback to the transmitting UE 402. In some aspects, the HARQ feedback from multiple UEs may be transmitted at the same time or in an overlapping manner. The feedback from multiple UEs may have a single frequency network (SFN) effect. The SFN effect may happen when multiple transmitters simultaneously send the same signal over the same frequency resource so that the signals can be combined by a receiver. Thus, the HARQ feedback may comprise combined NACK feedback from any receiving UE that did not receive the message correctly. The transmitting UE 402 may assess the signal strength of the combined NACK feedback in the common resource in order to determine whether to retransmit the message. In some aspects, the transmitting UE 402 may determine to resend the message if the signal strength measured for the negative HARQ feedback meets a second threshold, then the transmitting UE 402 may resend the message for the service group. When the signal strength of the combined NACK is above the second threshold, it may indicate that multiple receiving UEs did not receive the message correctly or may indicate that at least one UE within the intended range of the message did not receive the message correctly. On the other hand, the transmitting UE 402 may determine to refrain from resending the message if the signal strength measured for the negative HARQ feedback is below the second threshold. When the combined NACK has a signal strength below the second threshold, it may indicate that a small number or a single receiving UE did not receive the message correctly, that the receiving UEs are not proximate to the transmitting UE 402, and/or that no receiving UEs within the intended range of the message were unsuccessful in receiving the message. By measuring the signal strength, the transmitting UE 402 may avoid wasting wireless resources by limiting retransmissions of the message, thereby increasing the efficiency and reliability of the overall system.

For example, the transmitting UE 402 may determine the received strength of the NACK from receiving UEs. If the RSSI/RSRP of the NACK exceeds a second threshold, then the transmitting UE 402 may decide to retransmit. In some aspects, the second threshold may be based on at least one of an intended range for the message and/or a QoS requirement for the message. When multiple receiving UEs in a desired range do not receive the message, the combined signal strength of the NACKs may be higher than when one or two UEs do not receive the message. If the signal strength measured for the HARQ feedback exceeds the second threshold, which may indicate multiple receiving UEs in desired range do not receive the message, rather than one or two receiving UEs not receiving the message. In this way, the transmitting UE 402 may retransmit the message when multiple receiving UEs in desired range do not receive the message, and may avoid unnecessary retransmitting.

Figure 5:
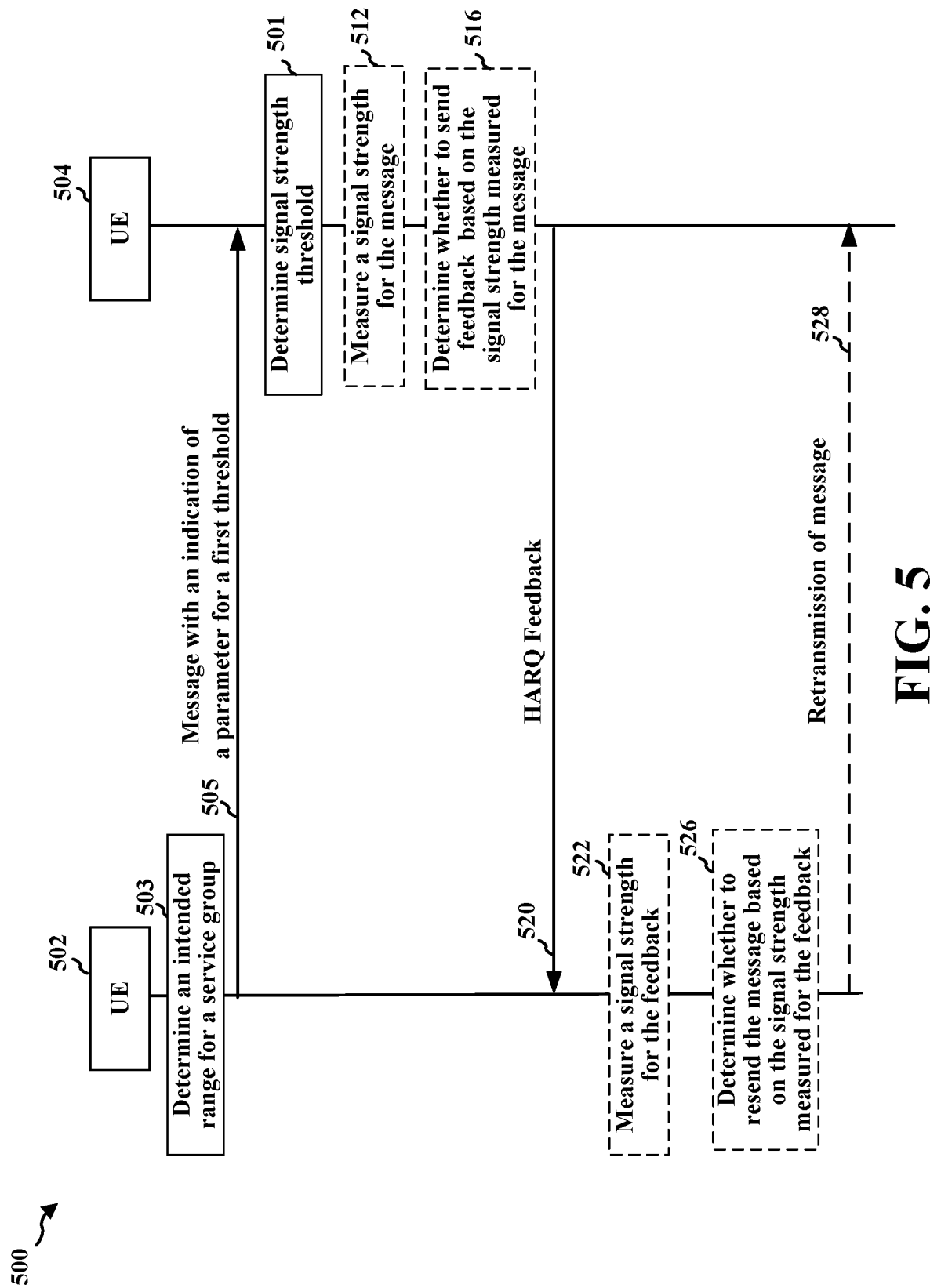
FIG. 5 is a diagram illustrating mechanism to enable reliable communication, e.g., in V2X communication, V2V communication, and/or other D2D communication.

FIG. 5 illustrates an example communication flow 500 between a transmitting device 502 and a receiving device 504. The communication may be based on V2X/V2V/D2D communication, e.g., PC5 multicast communication. In some aspects, the communication may be based on other D2D direct communication, such as ProSe. Although FIG. 5 illustrates an example of communication between a transmitting device 502 and a receiving device 504 that are illustrated as UEs, the concepts are equally applicable to a base station, an RSU, a mobile UE, a vehicle UE, etc. that are engaged in PC5 based communication, V2X/V2V communication or other direct D2D communication. The method may help to avoid retransmissions to a receiving device that may be too distant to correctly receive a message. The method may help reduce system degradation due to such retransmissions, and therefore, may improve the efficient use of wireless resources. The method may also help to avoid reception of feedback from unintended receiving devices that are a part of a service group yet are not proximate to a transmitting device.

At 503, the transmitting device 502 may determine an intended range for a service group. Because negative feedback from distant receiving devices may cause the transmitting device to retransmit the message to receiving devices outside of the intended range and degrade the overall system performance, feedback may be limited to receiving devices within the intended range (e.g., in the proximity of the transmitting device 502).

At 505, the transmitting device 502 may transmit a message for the service group. For example, the transmitting device may multicast the message to the service group. The transmitting device 502 may provide an indication of a parameter for a first signal strength threshold associated with the service group, where the first signal strength threshold may be used by the receiving device 504 to determine whether to send feedback to the message. At 501, the receiving device 504 may determine a first signal strength threshold based on the indication of the parameter, where the parameter may be an explicit indication of the first signal strength threshold or a QoS parameter associated with the service group from which the first signal strength threshold may be determined. In an alternate example, the message may not contain an indication of the parameter. In some examples, the receiving device 504 may determine the signal strength threshold, e.g., based on a QoS associated with the service group or based on other information. For example, the receiving device 504 may determine the signal strength threshold based on previously received or preconfigured information. The signal strength threshold may be preconfigured at the receiving device. The receiving device 504 may receive, from the transmitting device 502, at least a portion of the message for the service group.

At 512, the receiving device 504 may measure a signal strength for the message received from the transmitting device 502. The signal strength measured for the HARQ feedback may comprise at least one of an RSSI and/or RSRP.

At 516, the receiving device 504 may determine whether to send feedback to the transmitting device 502 based on the signal strength measured for the message. If the measured signal strength is below the threshold, the receiving device 504 may determine that it does not need to send feedback regardless of whether the message is correctly received.

At 520, the receiving device 504 may send feedback to the transmitting device 502. For example, the receiving device 504 may determine to send the feedback if the signal strength measured for the message meets a first threshold. For example, the receiving device 504 may transmit negative HARQ feedback to the transmitting device 502 if the message is not correctly received. In another example, the receiving device 504 may transmit positive feedback if the message is received correctly. The transmitting device 502 may receive the HARQ feedback from the receiving device 504.

At 522, the transmitting device 502 may measure a signal strength for the HARQ feedback.

At 526, the transmitting device 502 may determine whether to resend the message based on the signal strength measured for the HARQ feedback. For example, when the HARQ feedback comprises negative HARQ feedback, the transmitting device 502 may determine to resend the message, e.g., in retransmission 528, if the signal strength measured for the negative HARQ feedback meets a second threshold, then the transmitting device 502 may resend the message for the service group. For example, the transmitting device 502 may determine to refrain from resending the message if the signal strength measured for the negative HARQ feedback is below the second threshold.

Figure 6:
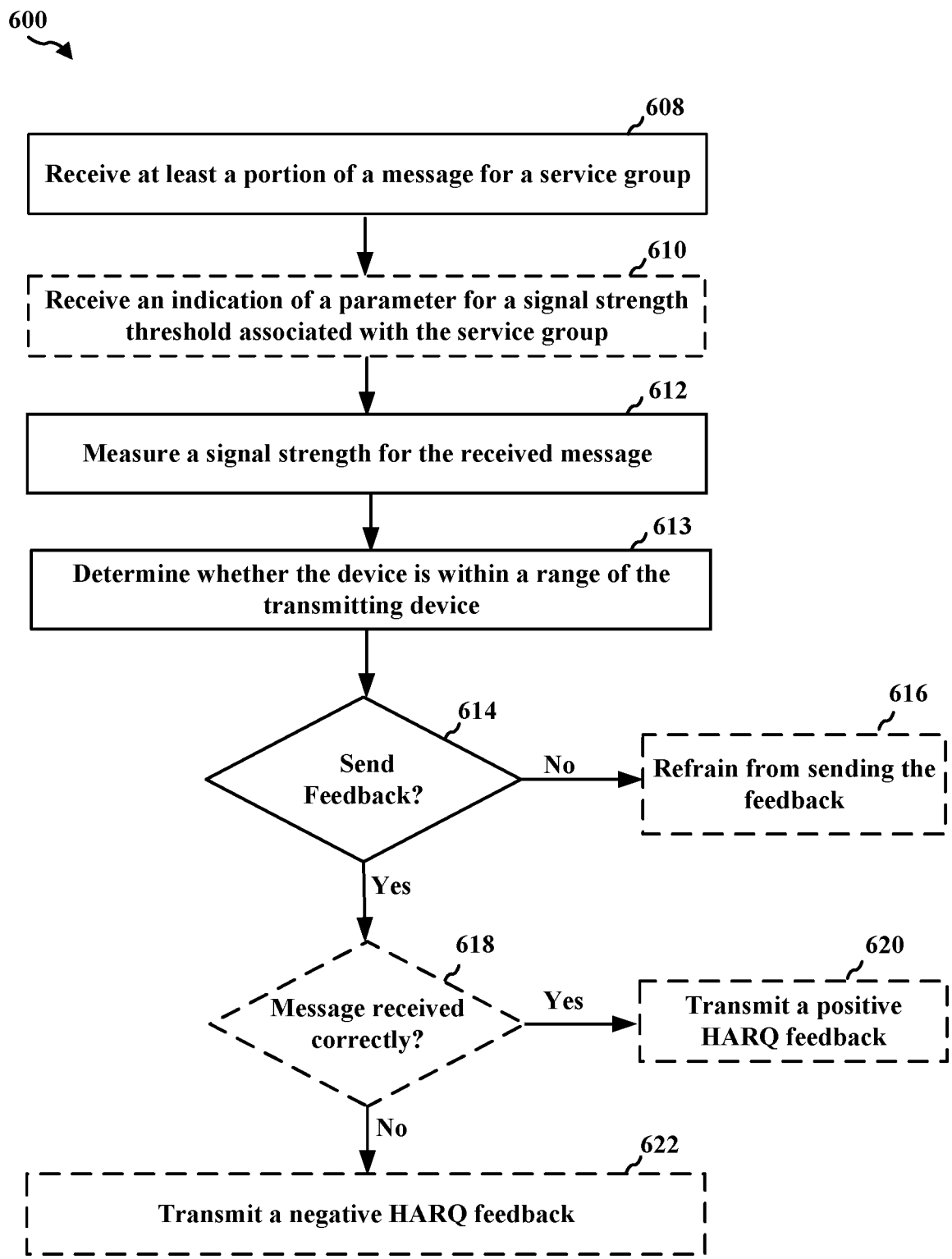
FIG. 6 is a flowchart of a method of wireless communication.

FIG. 6 is a flowchart 600 of a method of wireless communication at a receiving device. The method may be performed, for example, by a receiving UE or a component of a UE (e.g., UE 104, 404, 1050; receiving device 504; the apparatus 702/702'; the processing system 814, which may include memory and which may be an entire UE or a component of a UE). The apparatus may communicate with a transmitting device (e.g., transmitting UE 402, transmitting device 502). The apparatus may comprise an RSU 107, or a component of an RSU 107, a base station 102, 180 or component of a base station engaged in PC5 communication. The wireless communication may comprise D2D communication, such as V2X communication, V2V communication, or other D2D communication, as described herein. To facilitate an understanding of the techniques and concepts described herein, the method of flowchart 600 may be discussed with reference to the examples illustrated in FIGS. 4 and 5. Optional aspects may be illustrated in dashed lines. Aspects presented herein may help to limit feedback to intended receiving devices, e.g., to devices that are part of a service group and that are within an intended range of the transmitting device. The method may help to avoid triggering transmissions at a transmitting device to a receiving device that may be too distant to correctly receive a message. The method may help reduce system degradation due to such retransmissions, and therefore, may improve the efficient use of wireless resources. The method may also help to avoid feedback from unintended receiving devices that are a part of a service group yet are not proximate to a transmitting device.

At 608, the receiving device may receive, from the transmitting device, at least a portion of a message for a service group. The reception of the message may be performed, e.g., by reception component 704 of apparatus 702. In some aspects, the message may comprise an information element associated with a group ID for the service group. The message may comprise a V2X/V2V/D2D message. The message may be received via multicast in one example. An example of a multicast is a groupcast for a group of UEs.

At 610, the receiving device may receive a parameter (e.g., a QoS parameter) from the transmitting device, where the threshold may be based at least in part on the parameter. The parameter may be received, e.g., by reception component 704 of apparatus 702 and provided to determination component 710. In some aspects, the threshold may be configured at the transmitting device. In some aspects, the indication of the parameter may be included in the received message. As an example, the measured signal strength (e.g., RSSI/RSRP) threshold may be configured based on the QoS parameter associated with the multicast service. In an example, the parameter may be the threshold for the measured signal strength.

For example, when the receiving device is configured to listen to the group ID of the message, e.g., a group ID of a V2X multicast service, the corresponding threshold may be also configured. As an example, a configured threshold may be preconfigured or provisioned via a protocol, e.g., open mobile alliance device management (OMA-DM) protocol via a user plane for the receiving device, or a UE policy provisioning protocol via a control plane. As another example, the measured signal strength (e.g., RSSI/RSRP) threshold may be included in the control information of the message, e.g., in SCI of the V2X multicast message. For example, the measured signal strength (e.g., RSSI/RSRP) threshold may be dynamically adjustable. The transmitting device (e.g., multicast sender) may adjust the transmission range by dynamically adjusting the threshold per transmission.

In some aspects, the message may include an information element based on a hash of a group ID for the service group and the parameter for the signal strength threshold. For example, if the transmitting device (e.g., the multicast sender) is to send a group ID plus a limited set of extra information, the transmitting device may hash the group ID+extra information into an information element (e.g., a shorter identifier) that is embedded in the control portion of the message. For example, the extra information may include the RSSI/RSRP threshold or a parameter that enables the receiving device to determine the RSSI/RSRP threshold.

At 612, the receiving device may measure a signal strength for the received message. The measurement may be performed, e.g., by measurement component 708 of apparatus 702. In some aspects, the signal strength measured for the message comprises at least one of an RSSI, an RSRP, or a combination of RSSI and RSRP. For example, the receiving device may measure the signal strength (e.g., RSSI/RSRP) for the received message. In some aspects, the signal strength may be measured based on a control portion of the message, a data portion of the message, or both a data portion of the message and a control portion of the message.

As illustrated at 613, the receiving device may determine whether the receiving device is within a range of the transmitting device based on the measured signal strength for the received message. The range may be based on a distance from the transmitting device in which receiving devices are intended to correctly receive the message. The determination may be performed, e.g., by range component 714 of apparatus 702. The receiving device may compare the measured signal strength (e.g., RSSI/RSRP) with a threshold, to determine if the receiving device is the "intended" receiver or not. In some aspects, the threshold may be based on an intended range for the received message. For example, the achieved range/distance by the transmitting device (e.g., sender) may be linked to a QOS parameter defined for the received message. The RSSI/RSRP threshold may be mapped from the QoS parameter, 5QI, range, etc. for the received message. In some aspects, the RSSI/RSRP threshold may be based at least in part on the QoS parameter. For example, the QoS parameter may be a "stand-alone" range parameter, or 5QI which incorporates range requirement. The receiving device may use more than one threshold, e.g., an upper threshold and a lower threshold to determine whether the UE is within an intended range. For example, the receiving device may determine whether the measured signal strength is within a signal strength range having an upper bound and a lower bound.

At 614, the receiving device may determine whether to send a feedback to the transmitting device based on the signal strength measured for the received message. For example, the receiving device may determine to send feedback to the transmitting device when the receiving device is within the range of the transmitting device, e.g., an intended range for accurate reception of the message. The feedback may include HARQ feedback. The determination may be performed, e.g., by determination component 710 of apparatus 702. In some aspects, the receiving device may determine to send the feedback if the signal strength measured for the received message meets the threshold. When the measured signal strength meets a threshold signal strength, it may be an indication that the receiving device is within an intended range of the transmitting device. Therefore, the receiving device may determine that it should send feedback to the transmitting device.

For example, if the measured signal strength meets the threshold, the receiving device may determine whether the message is received correctly, as illustrated at 618. In other examples, the determination about whether the message is received correctly may be made prior to determining the measured signal strength. The determination may be performed, e.g., by determination component 710 of apparatus 702. The receiving UE may use a delta in connection with the transmission power at which the message was transmitted to determine whether the receiving UE is an intended receiver and/or whether to send feedback. The receiving UE may also use other parameters to determine whether to send feedback. For example, the receiving UE may use parameters received in a control message (e.g., sidelink control information SCI). The receiving UE may use a current interference level of the receiving UE, a channel busy ratio (CBR) of the receiving UE, etc. to determine whether to send feedback For example, the receiving device may transmit negative HARQ feedback (e.g., a NACK) to the transmitting device if the message is not correctly received, as illustrated at 622. The receiving device may transmit positive HARQ feedback (e.g., an ACK) to the transmitting device if the message is correctly received, as illustrated at 620. The feedback may be transmitted, e.g., by feedback component 712 of apparatus 702.

If the signal strength measured for the message is below the threshold, the receiving device may determine that it is not within the intended range of the transmitting device. Thus, the receiving device may determine to refrain from sending the feedback to the transmitting device, regardless of whether the packet is received correctly or not, as illustrated at 616. In this way, the method disclosed herein may help to avoid feedback from distant UEs, and may help to avoid retransmissions. Aspects of the method may improve performance and reliability of the overall communication system.

Figure 7:
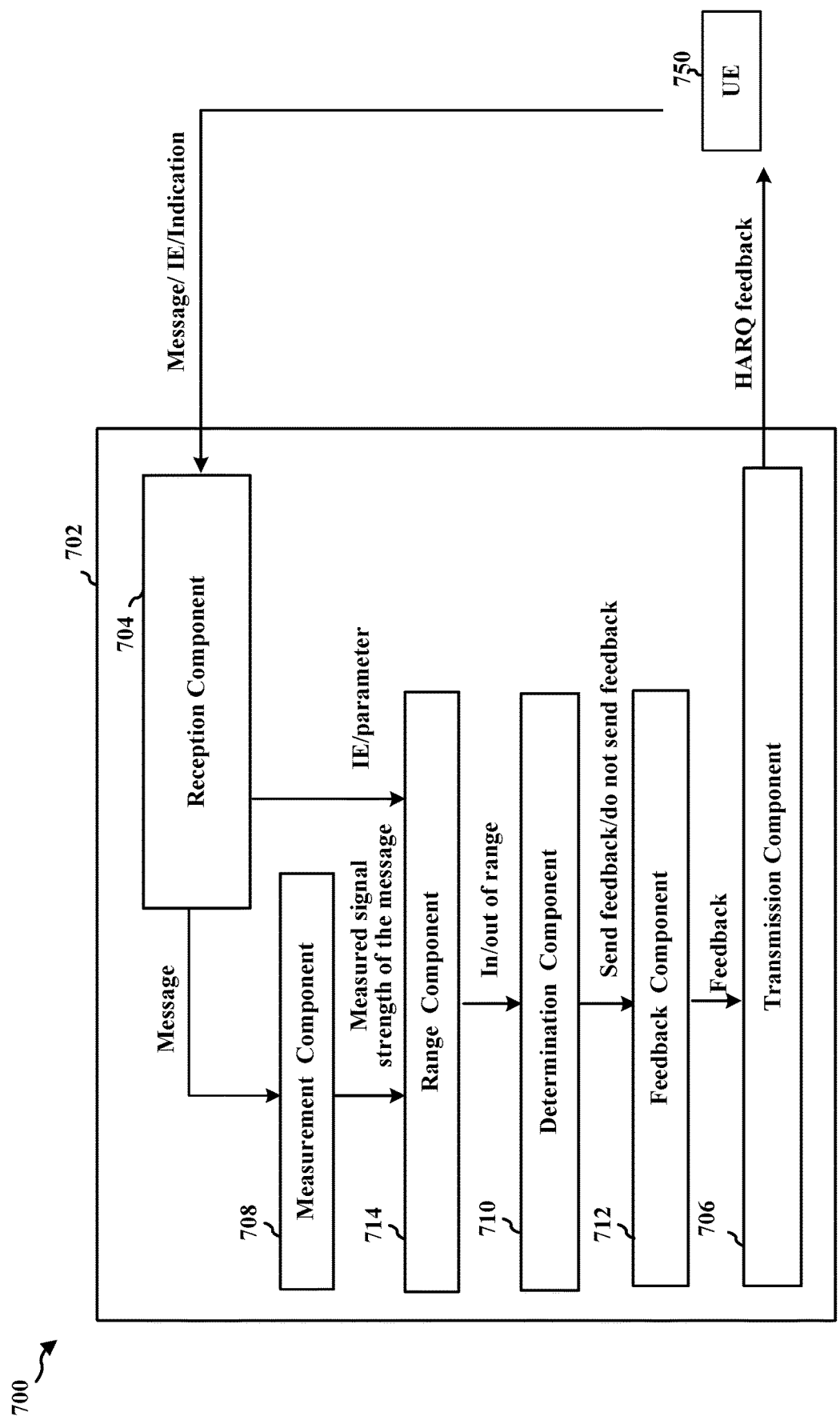
FIG. 7 is a conceptual data flow diagram illustrating the data flow between different means/components in an example apparatus.

FIG. 7 is a conceptual data flow diagram 700 illustrating the data flow between different means/components in an example apparatus 702. The apparatus may be a receiving device or a component of a receiving device that receives wireless communication from a transmitting device. The apparatus may comprise a UE 104 or a component of a UE, an RSU 107 or a component of an RSU, or a base station 102, 180 or component of a base station engaged in PC5 communication. The wireless communication may comprise a V2X, V2V, or other D2D communication, as described herein.

The apparatus includes a reception component 704 configured to receive, from a transmitting device, at least a portion of a message for a service group, e.g., as described in connection with 608 in FIG. 6. The reception component may be further configured to receive an indication of a parameter (e.g., the QoS parameter) from the transmitting device, as described in connection with 610. The reception component may use a group ID for a service group to receive the message. The apparatus includes a measurement component 708 configured to measure a signal strength for the received message, e.g., as described in connection with 612 in FIG. 6. The apparatus includes a determination component 710 configured to determine whether to send feedback to the transmitting device based on the signal strength measured for the received message, e.g., as described in connection with 614 and/or 618 of FIG. 6. The apparatus includes a feedback component 712 configured to transmit a HARQ feedback, via a transmission component 706, to the transmitting device, e.g., as described in connection with 620 and/or 622 of FIG. 6.

The apparatus may include additional components that perform each of the blocks of the algorithm in the aforementioned flowcharts of FIGS. 4-6. As such, each block in the aforementioned flowcharts of FIGS. 4-6 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 8:
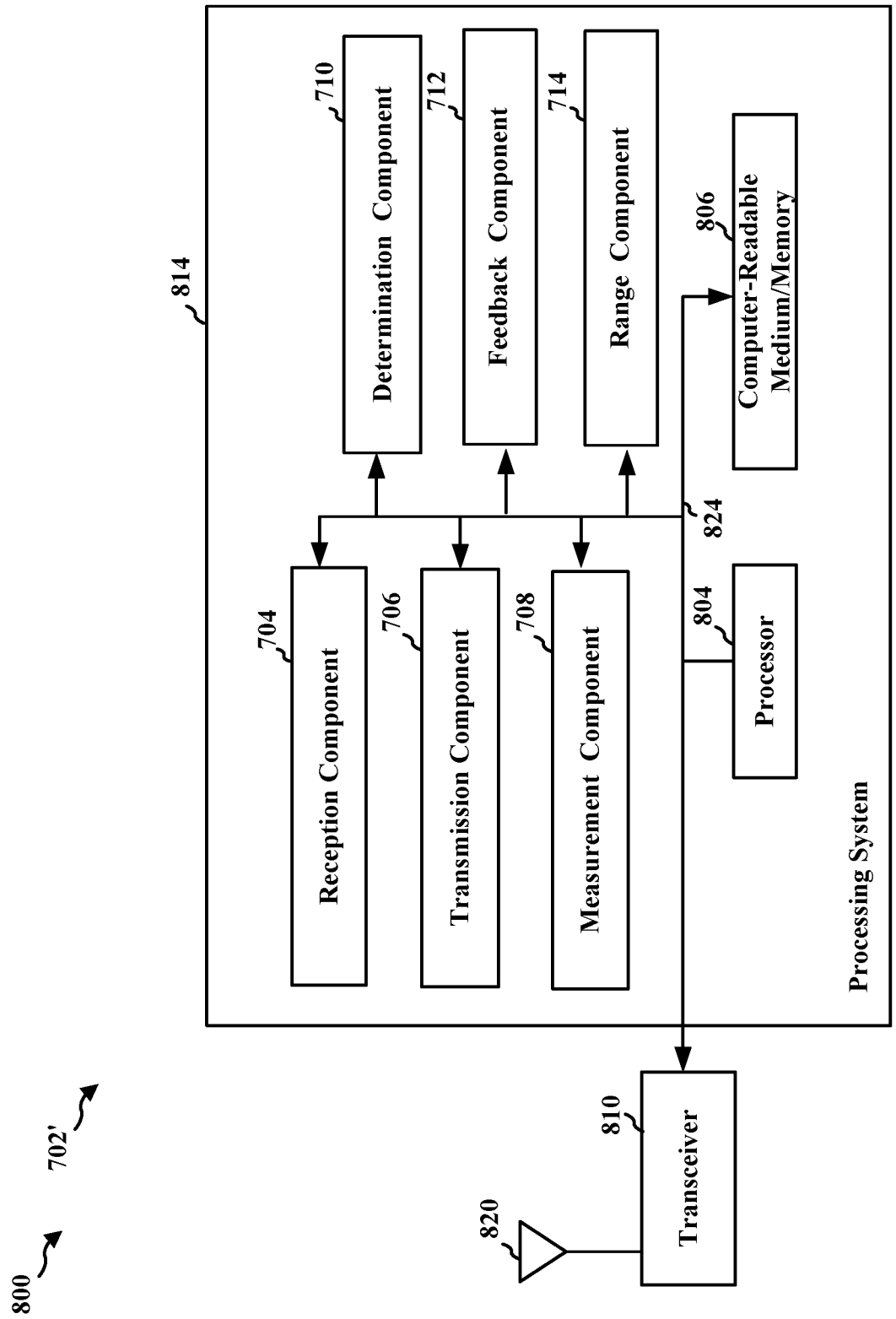
FIG. 8 is a diagram illustrating an example of a hardware implementation for an apparatus employing a processing system.

FIG. 8 is a diagram 800 illustrating an example of a hardware implementation for an apparatus 702' employing a processing system 814. The processing system 814 may be implemented with a bus architecture, represented generally by the bus 824. The bus 824 may include any number of interconnecting buses and bridges depending on the specific application of the processing system 814 and the overall design constraints. The bus 824 links together various circuits including one or more processors and/or hardware components, represented by the processor 804, the components 704, 706, 708, 710, 712, 714 and the computer-readable medium/memory 806. The bus 824 may also link various other circuits such as timing sources, peripherals, voltage regulators, and power management circuits, which are well known in the art, and therefore, will not be described any further.

The processing system 814 may be coupled to a transceiver 810. The transceiver 810 is coupled to one or more antennas 820. The transceiver 810 provides a means for communicating with various other apparatus over a transmission medium. The transceiver 810 receives a signal from the one or more antennas 820, extracts information from the received signal, and provides the extracted information to the processing system 814, specifically the reception component 704. In addition, the transceiver 810 receives information from the processing system 814, specifically the transmission component 706, and based on the received information, generates a signal to be applied to the one or more antennas 820. The processing system 814 includes a processor 804 coupled to a computer-readable medium/memory 806. The processor 804 is responsible for general processing, including the execution of software stored on the computer-readable medium/memory 806. The software, when executed by the processor 804, causes the processing system 814 to perform the various functions described supra for any particular apparatus. The computer-readable medium/memory 806 may also be used for storing data that is manipulated by the processor 804 when executing software. The processing system 814 further includes at least one of the components 704, 706, 708, 710, 712, 714. The components may be software components running in the processor 804, resident/stored in the computer readable medium/memory 806, one or more hardware components coupled to the processor 804, or some combination thereof. In one configuration, the processing system 814 may be a component of a UE, e.g., device 350, and may include the memory 360 and/or at least one of the TX processor 368, the RX processor 356, and the controller/processor 359. Alternatively, the processing system 814 may comprise the entire device 350, e.g., an entire UE.

In one configuration, the apparatus 702/702' for wireless communication includes means for receiving, from a transmitting UE, at least a portion of a message for a service group. The apparatus may include means for measuring a signal strength for the received message received and for determining whether the receiving device is within a range of the transmitting device based on the measured signal strength for the received message. The apparatus may include means for determining to send the feedback when the first receiving device is within the range. The apparatus may include means for sending the feedback, e.g., including sending negative HARQ feedback if the message is not received correctly and sending positive HARQ feedback if the message is received correctly. The apparatus may include means for receiving a parameter from the transmitting device, wherein the threshold is based on the parameter. The aforementioned means may be one or more of the aforementioned components of the apparatus 702 and/or the processing system 814 of the apparatus 702' configured to perform the functions recited by the aforementioned means. As described supra, the processing system 814 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 9:
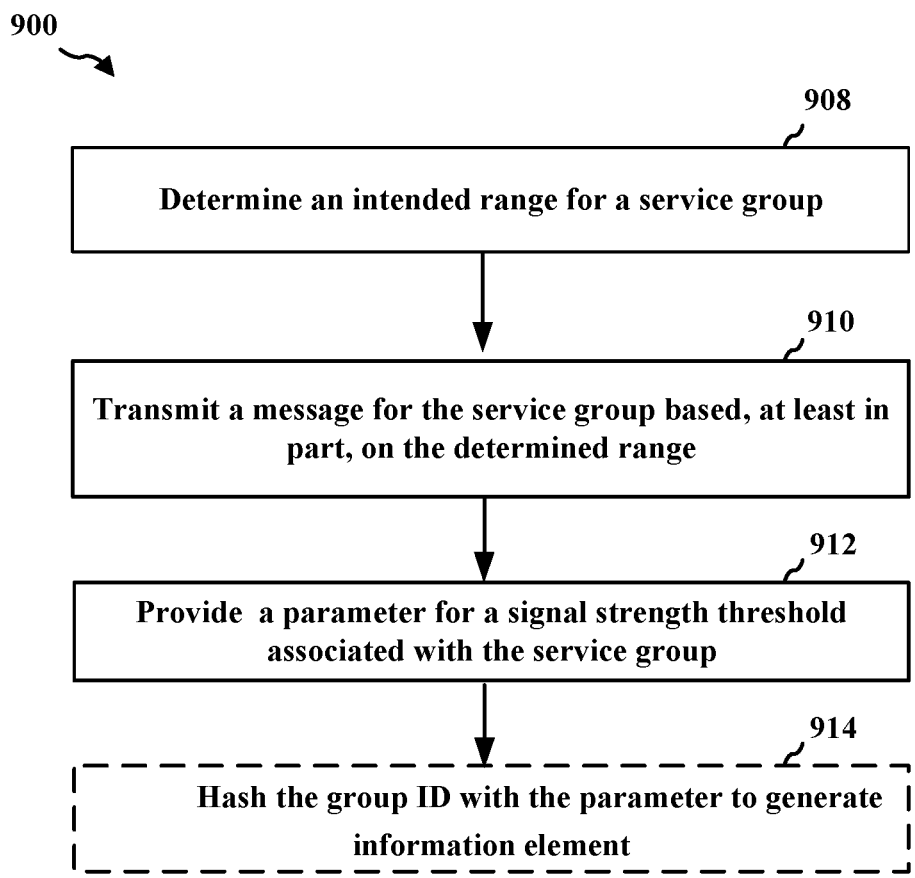
FIG. 9 is a flowchart of a method of wireless communication.

FIG. 9 is a flowchart 900 of a method of wireless communication at a transmitting device. The transmitting device may comprise a UE 104 or a component of a UE, an RSU 107 or a component of an RSU, or a base station 102, 180 or component of a base station, e.g., engaged in PC5 communication. The method may be performed, for example, by a transmitting UE 402; transmitting device 502; the apparatus 1002/1002'; the processing system 1114, which may include memory and which may be an entire UE or a component of a UE. The wireless communication may comprise D2D communication, such as V2X communication, V2V communication, or other D2D communication. To facilitate an understanding of the techniques and concepts described herein, the method of flowchart 900 may be discussed with reference to the examples illustrated in FIGS. 4 and 5. Optional aspects may be illustrated in dashed lines. Aspects presented herein may help to limit feedback to avoid retransmissions to a receiving device that may be too distant to correctly receive a message. The method may help reduce system degradation due to such retransmissions, and therefore, may improve the efficient use of wireless resources. The method may also help to avoid reception of feedback from unintended receiving devices that are a part of a service group yet are not proximate to a transmitting device.

At 908, the transmitting device determines an intended range for the service group. The intended range may correspond to a distance from the transmitting device in which receiving device are intended to correctly receive a message. The intended range may be determined, e.g., based on a QoS profile associated with the service group, e.g., a 5QI. The determination may be performed, e.g., by determination component 1008 of apparatus 1002.

At 910, the transmitting device may transmit a message for the service group based, at least in part, on the determined range. The message may comprise a V2X message or a D2D message, for example. The message may be transmitted, e.g., by transmission component 1006 of apparatus 1002. The message may include a control portion and a data portion.

The transmitting device may provide a parameter for the signal strength threshold associated with the service group, as illustrated at 912. The transmitting device may provide the signal strength threshold itself as the parameter or may provide a parameter that enables the receiving device to determine the signal strength threshold. The parameter may be provided, e.g., by IE component 1010 and/or indication component 1014, via transmission component 1006 of apparatus 1002. For example, the parameter may assist receiving devices in determining a signal strength threshold in order to determine whether to send the feedback to the message. Thus, the parameter may help the transmitting device to receive limited feedback from receivers within an intended area. In some aspects, the parameter may include a QoS parameter associated with a service group. The parameter provides information that enables receiving devices to determine whether they are an intended receiver, e.g., based on proximity through the signal strength threshold. For example, the parameter may be comprised in the message.

The message may further comprise an information element associated with a group ID for the service group. The group ID may be provided, e.g., by group ID component 1012 of apparatus 1002. In some aspects, the transmitting device may hash the group ID with the parameter to generate the information element, as illustrated at 914.

Figure 10:
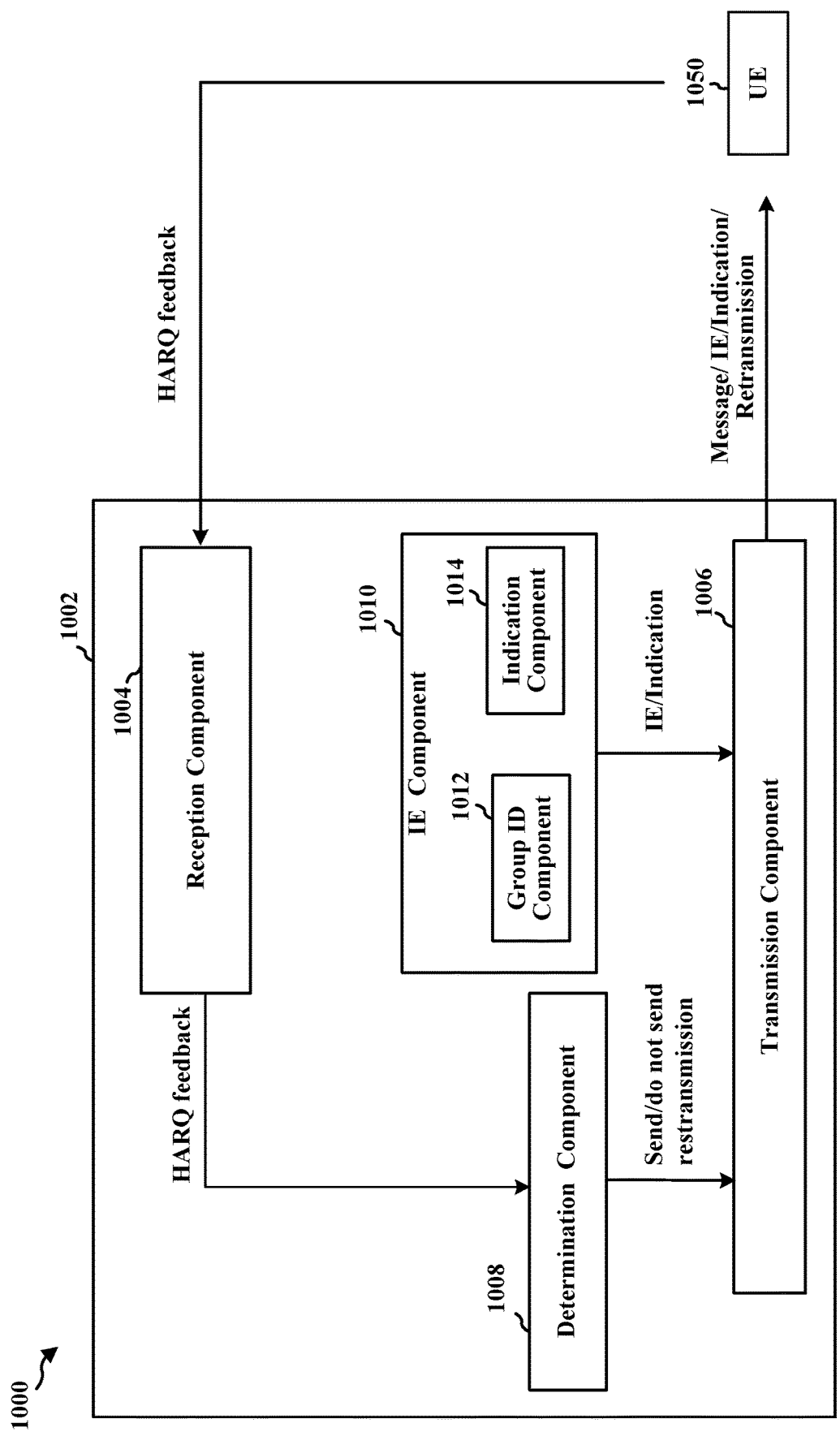
FIG. 10 is a conceptual data flow diagram illustrating the data flow between different means/components in an example apparatus.

FIG. 10 is a conceptual data flow diagram 1000 illustrating the data flow between different means/components in an example apparatus 1002. The apparatus may be a transmitting device or a component of a transmitting device that transmits wireless communication to a receiving device. The apparatus may comprise a UE 104 or a component of a UE, an RSU 107 or a component of an RSU, or a base station 102, 180 or component of a base station engaged in PC5 communication. The wireless communication may comprise a V2X, V2V, or other D2D communication, as described herein.

The apparatus includes a reception component 1004 that receives feedback from receiving UE(s). The apparatus includes a determination component 1008 for determining an intended range for a service group. The apparatus may include a transmission component 1006 for transmitting a message for the service group based, at least in part, on the determined range.

The apparatus may also include an IE component 1010 for hashing a group ID with an indication of the parameter to generate information element. For example, the apparatus may include an indication component 1014 for providing a parameter for the signal strength threshold associated with the service group. For example, the signal strength threshold may be used by RX devices to determine whether to send the feedback to the message. For example, the parameter may be comprised in the message. For example, the apparatus may include a group ID component 1012 for providing a group ID. For example, the message may further comprise the information element associated with the group ID for the service group and the indication.

The apparatus may include additional components that perform each of the blocks of the algorithm in the aforementioned flowcharts of FIGS. 4, 5 and 9. As such, each block in the aforementioned flowcharts of FIGS. 4, 5 and 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 11:
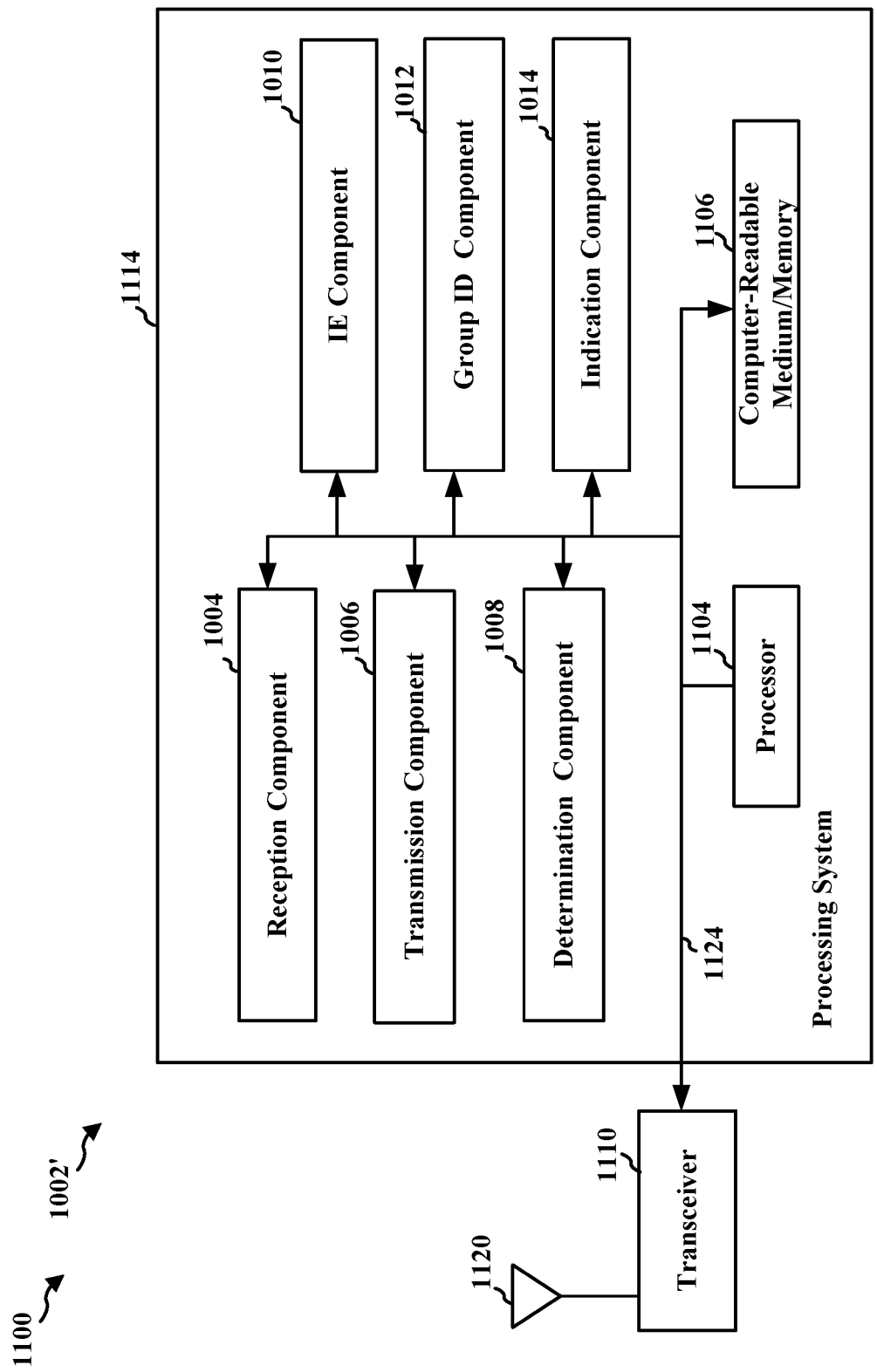
FIG. 11 is a diagram illustrating an example of a hardware implementation for an apparatus employing a processing system.

FIG. 11 is a diagram 1100 illustrating an example of a hardware implementation for an apparatus 1002' employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware components, represented by the processor 1104, the components 1004, 1006, 1008, 1010, 1012, 1014 and the computer-readable medium/memory 1106. The bus 1124 may also link various other circuits such as timing sources, peripherals, voltage regulators, and power management circuits, which are well known in the art, and therefore, will not be described any further.

The processing system 1114 may be coupled to a transceiver 1110. The transceiver 1110 is coupled to one or more antennas 1120. The transceiver 1110 provides a means for communicating with various other apparatus over a transmission medium. The transceiver 1110 receives a signal from the one or more antennas 1120, extracts information from the received signal, and provides the extracted information to the processing system 1114, specifically the reception component 1004. In addition, the transceiver 1110 receives information from the processing system 1114, specifically the transmission component 1006, and based on the received information, generates a signal to be applied to the one or more antennas 1120. The processing system 1114 includes a processor 1104 coupled to a computer-readable medium/memory 1106. The processor 1104 is responsible for general processing, including the execution of software stored on the computer-readable medium/memory 1106. The software, when executed by the processor 1104, causes the processing system 1114 to perform the various functions described supra for any particular apparatus. The computer-readable medium/memory 1106 may also be used for storing data that is manipulated by the processor 1104 when executing software. The processing system 1114 further includes at least one of the components 1004, 1006, 1008, 1010, 1012, 1014. The components may be software components running in the processor 1104, resident/stored in the computer readable medium/memory 1106, one or more hardware components coupled to the processor 1104, or some combination thereof. In one configuration, the processing system 1114 may be a component of device 350 and may include the memory 360 and/or at least one of the TX processor 368, the RX processor 356, and the controller/processor 359. Alternatively, the processing system 814 may comprise the entire device 350, e.g., an entire UE.

In one configuration, the apparatus 1002/1002' for wireless communication includes means for determining an intended range for a service group. The apparatus may include means for transmitting a message for the service group based, at least in part, on the determined range. The apparatus may include means for providing a parameter for a signal strength threshold associated with the service group. The apparatus may include means for hashing a group ID and/or parameter in order to generate an IE. The aforementioned means may be one or more of the aforementioned components of the apparatus 1002 and/or the processing system 1114 of the apparatus 1002' configured to perform the functions recited by the aforementioned means. As described supra, the processing system 1114 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 12:
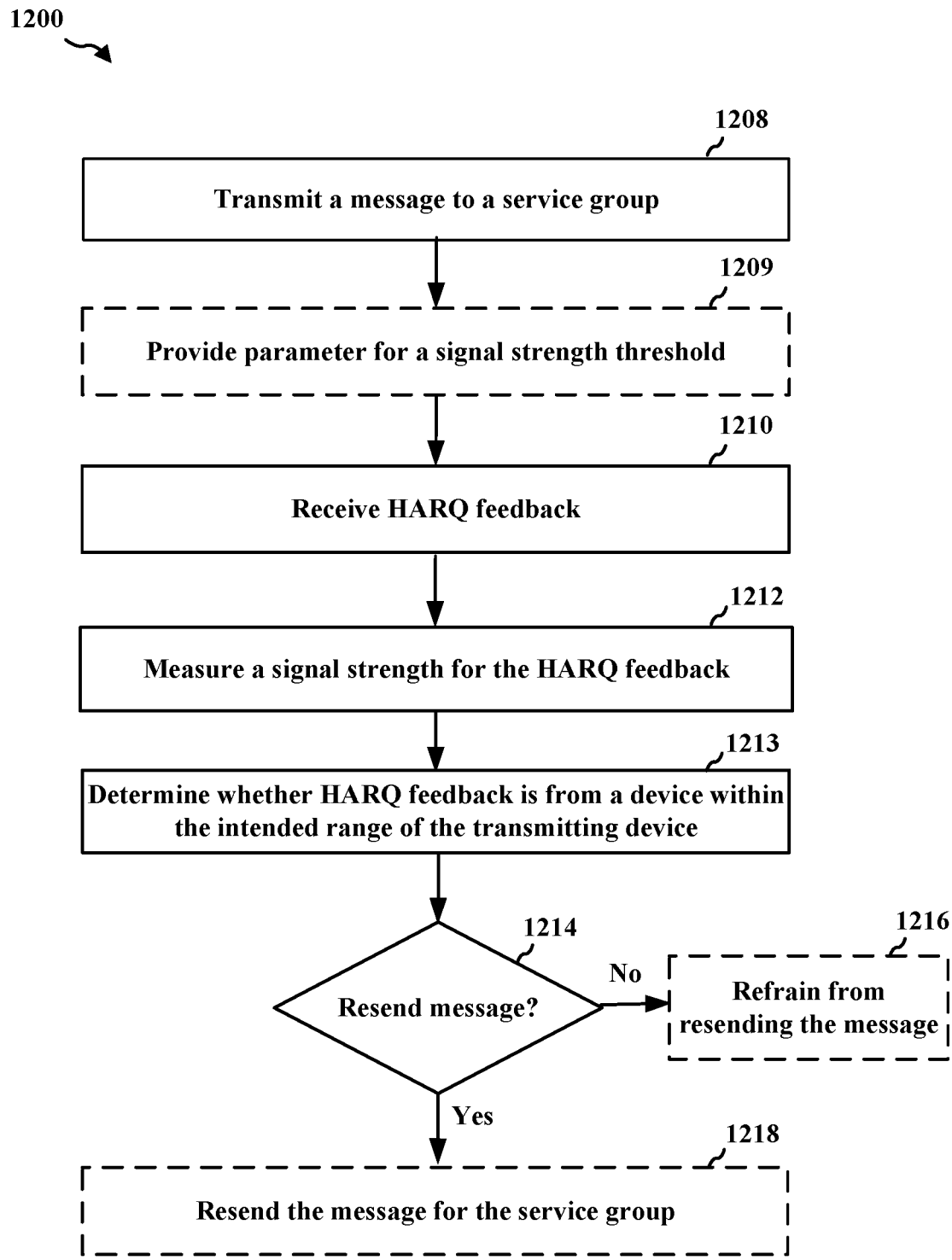
FIG. 12 is a flowchart of a method of wireless communication.

FIG. 12 is a flowchart 1200 of a method of wireless communication at a transmitting device. The transmitting device may comprise a UE 104, a component of a UE 104, an RSU 107, a component of an RSU 107, a base station 102, 180, or component of a base station, e.g., engaged in PC5 communication. The method may be performed, for example, by transmitting UE 402; transmitting device 502; the apparatus 1002/1002'; the processing system 1114, which may include memory and which may be an entire UE or a component of a UE. The wireless communication may comprise D2D communication, such as V2X communication, V2V communication, or other D2D communication. To facilitate an understanding of the techniques and concepts described herein, the method of flowchart 1200 may be discussed with reference to the examples illustrated in FIGS. 4 and 5. Optional aspects may be illustrated in dashed lines. Aspects presented herein may help to limit retransmissions to avoid retransmissions to a receiving device that may be too distant to correctly receive a message. The method may help reduce system degradation due to such retransmissions, and therefore, may improve the efficient use of wireless resources. The method may also help to avoid reception of feedback from unintended receiving devices that are a part of a service group yet are not proximate to a transmitting device.

At 1208, the transmitting device may transmit a message to a service group for an intended range. The message may be transmitted, e.g., via multicast. An example of a multicast is a groupcast to a group of UEs. The transmission may be performed, e.g., by transmission component 1306 of apparatus 1302. The message may comprise a V2X message or a D2D message.

As illustrated at 1209, the transmitting device may provide a parameter for a signal strength threshold. The signal strength threshold may help receiving devices to determine whether they are an intended receiver, e.g., within the intended range. The receiving devices may use the signal strength threshold to determine whether to provide feedback for the message. The parameter may be provided, e.g., by parameter component 1312 of apparatus 1302.

At 1210, the transmitting device may receive HARQ feedback from at least one receiving device. The feedback may be received, e.g., by reception component 1304 of apparatus 1302. The feedback may include combined feedback from multiple UEs that is received in a common resource.

At 1212, the transmitting device may measure a signal strength for the HARQ feedback. The measurement may be performed, e.g., by measurement component 1308 of apparatus 1302. The measurement may be based on RSSI and/or RSRP, for example. In the example in which the feedback includes combined feedback, the transmitting device may measure the combined signal strength of the combined feedback in the common resource.

At 1213, the transmitting device may determine whether the HARQ feedback is from receiving device(s) within the intended range and/or whether the combined signal strength meets a threshold. The determination may be based on the signal strength measured for the HARQ feedback. For example, a signal strength that meets the threshold may indicate that at least one receiving device is within the intended range of the transmitting device. The determination may be performed, e.g., by range component 1314 of apparatus 1302.

At 1214, the transmitting device may use the measurement to determine whether to resend the message based on the signal strength measured for the HARQ feedback. For example, the transmitting device may determine to resend the message when the HARQ feedback is from receiving device(s) within the intended range or when the measured signal strength meets a threshold signal strength level. The determination may be performed, e.g., by determination component 1310 of apparatus 1302. The HARQ feedback may be received in a common resource in time and frequency. Thus, the HARQ feedback may comprise combined feedback from one or more receiving devices.

In some aspects, the transmitting device may determine to resend the message if the signal strength measured for the negative HARQ feedback meets a threshold, then the transmitting device may resend the message for the service group, as illustrated at 1218. The retransmission may be performed, e.g., by transmission component 1306 of apparatus 1302. On the other hand, the transmitting device may determine to refrain from resending the message if the signal strength measured for the negative HARQ feedback is below the threshold, as illustrated at 1216.

For example, the transmitting device may determine the received strength of the NACK from receiving device(s). If the RSSI/RSRP of the NACK exceeds a threshold, then the transmitting device may decide to retransmit. In some aspects, the threshold may be based on at least one of an intended range for the message or a quality of service for the message.

Figure 13:
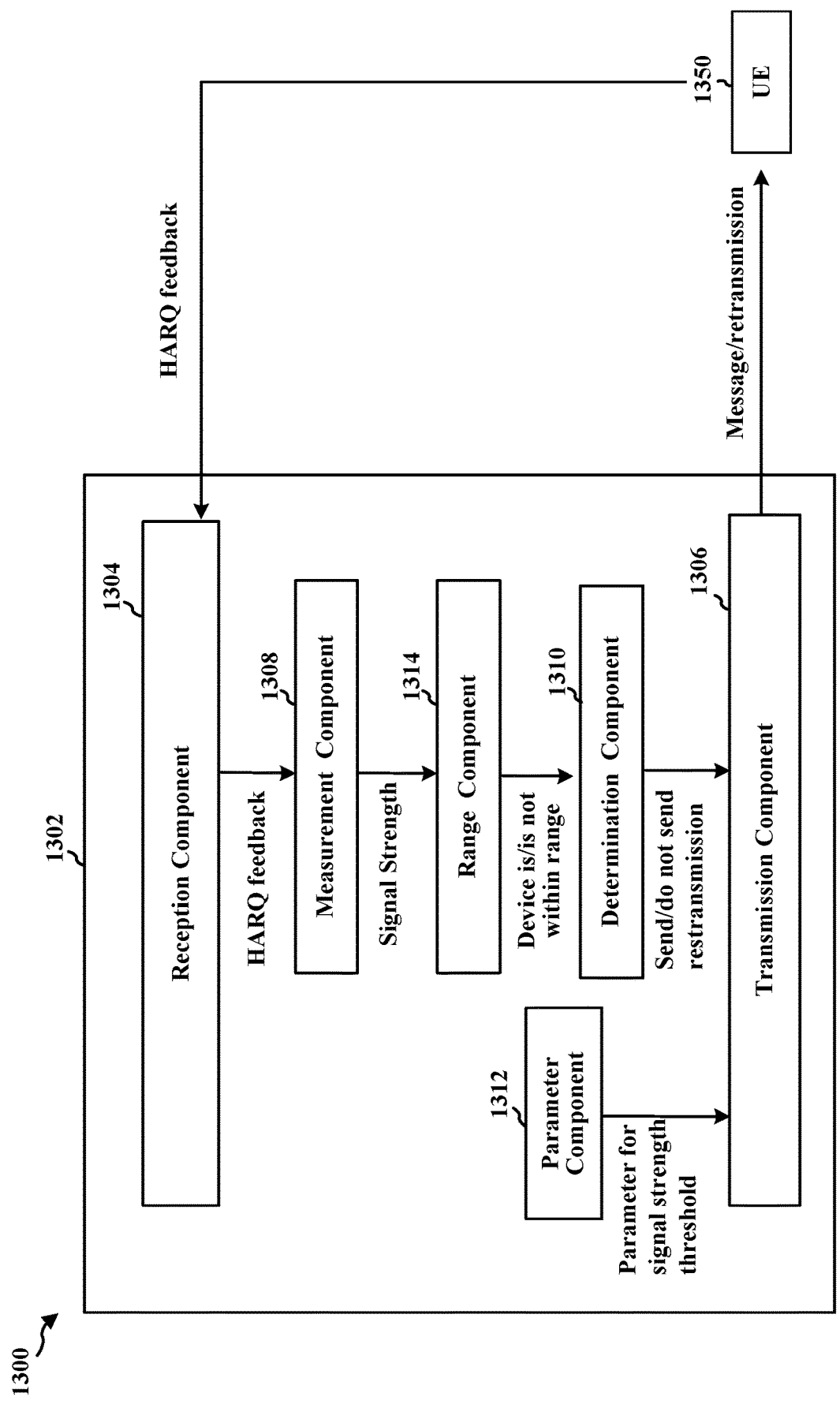
FIG. 13 is a conceptual data flow diagram illustrating the data flow between different means/components in an example apparatus.

FIG. 13 is a conceptual data flow diagram 1300 illustrating the data flow between different means/components in an example apparatus 1302. The apparatus may be a transmitting device or a component of a transmitting device that transmits wireless communication to a receiving device. The apparatus may comprise a UE 104 or a component of a UE, an RSU 107 or a component of an RSU, or a base station 102, 180 or component of a base station engaged in PC5 communication. The wireless communication may comprise D2D communication, such as V2X communication, V2V communication, or other D2D communication, as described herein.

The apparatus includes a transmission component 1306 configured to transmit (e.g., multicast) a message to a service group, e.g., as described in connection with 1208 in FIG. 12. The apparatus includes a reception component 1304 that receives HARQ feedback from at least one receiving device. The apparatus includes a measurement component 1308 configured to measure a signal strength for the HARQ feedback, e.g., as described in connection with 1212 in FIG. 12. The apparatus may include a range component 1314 configured to determine whether the HARQ feedback is from a receiving device within the intended range based on the signal strength measured for the HARQ feedback. The apparatus includes a determination component 1310 configured to determine whether to resend the message based on the signal strength measured for the HARQ feedback, e.g., as described in connection with 1214 in FIG. 12. In some aspects, the transmitting device may determine to resend the message if the signal strength measured for the negative HARQ feedback meets a second threshold, then the transmitting device may resend the message for the service group. On the other hand, the transmitting device may determine to refrain from resending the message if the signal strength measured for the negative HARQ feedback is below the second threshold. In some aspects, the second threshold may be based on at least one of an intended range for the message, or a quality of service for the message, or a combination of the intended range and the quality of service. The apparatus may include a parameter component 1312 configured to provide a parameter for a signal strength threshold to receiving device(s) 1350.

The apparatus may include additional components that perform each of the blocks of the algorithm in the aforementioned flowcharts of FIGS. 4, 5 and 12. As such, each block in the aforementioned flowcharts of FIGS. 4, 5 and 12 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 14:
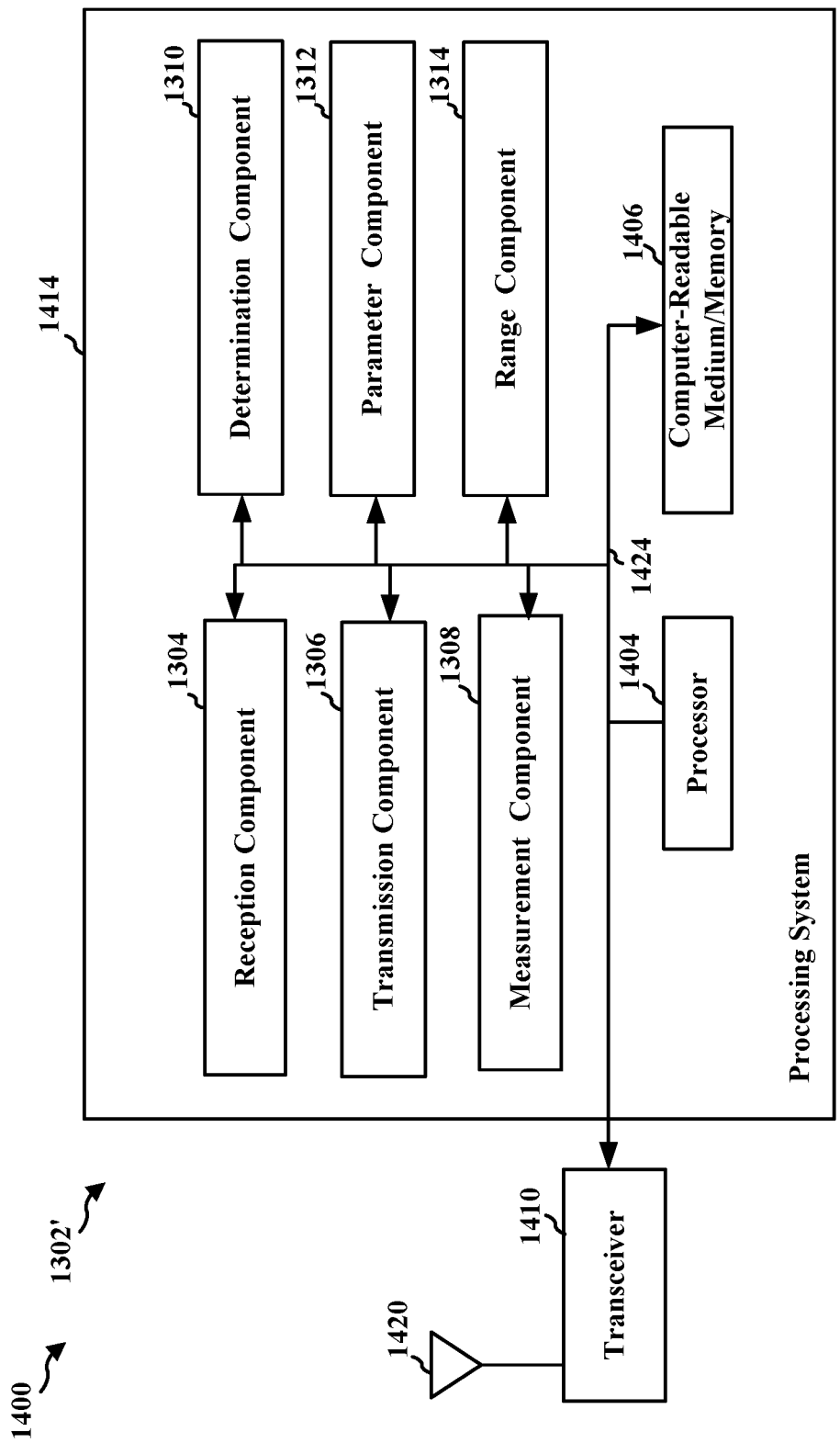
FIG. 14 is a diagram illustrating an example of a hardware implementation for an apparatus employing a processing system.

FIG. 14 is a diagram 1400 illustrating an example of a hardware implementation for an apparatus 1302' employing a processing system 1414. The processing system 1414 may be implemented with a bus architecture, represented generally by the bus 1424. The bus 1424 may include any number of interconnecting buses and bridges depending on the specific application of the processing system 1414 and the overall design constraints. The bus 1424 links together various circuits including one or more processors and/or hardware components, represented by the processor 1404, the components 1304, 1306, 1308, 1310, 1312, 1314, and the computer-readable medium/memory 1406. The bus 1424 may also link various other circuits such as timing sources, peripherals, voltage regulators, and power management circuits, which are well known in the art, and therefore, will not be described any further.

The processing system 1414 may be coupled to a transceiver 1410. The transceiver 1410 is coupled to one or more antennas 1420. The transceiver 1410 provides a means for communicating with various other apparatus over a transmission medium. The transceiver 1410 receives a signal from the one or more antennas 1420, extracts information from the received signal, and provides the extracted information to the processing system 1414, specifically the reception component 1304. In addition, the transceiver 1410 receives information from the processing system 1414, specifically the transmission component 1306, and based on the received information, generates a signal to be applied to the one or more antennas 1420. The processing system 1414 includes a processor 1404 coupled to a computer-readable medium/memory 1406. The processor 1404 is responsible for general processing, including the execution of software stored on the computer-readable medium/memory 1406. The software, when executed by the processor 1404, causes the processing system 1414 to perform the various functions described supra for any particular apparatus. The computer-readable medium/memory 1406 may also be used for storing data that is manipulated by the processor 1404 when executing software. The processing system 1414 further includes at least one of the components 1304, 1306, 1308, 1310, 1312, 1314. The components may be software components running in the processor 1404, resident/stored in the computer readable medium/memory 1406, one or more hardware components coupled to the processor 1404, or some combination thereof. In one configuration, the processing system 1414 may be a component of the device 350 and may include the memory 360 and/or at least one of the TX processor 368, the RX processor 356, and the controller/processor 359.

In one configuration, the apparatus 1302/1302' for wireless communication includes means for multicasting a message to a service group for an intended range. The apparatus may include means for receiving HARQ feedback from at least one RX UE. The apparatus may include means for measuring a signal strength for the HARQ feedback. The apparatus may include means for determining whether the HARQ feedback is from a receiving device within the intended range based on the signal strength measured for the HARQ feedback. The apparatus may include means for determining to resend the message based on the signal strength measured for the HARQ feedback. The aforementioned means may be one or more of the aforementioned components of the apparatus 1302 and/or the processing system 1414 of the apparatus 1302' configured to perform the functions recited by the aforementioned means. As described supra, the processing system 1414 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

The following examples are illustrative only and aspects thereof may be combined with aspects of other embodiments or teaching described herein, without limitation.

Example 1 is a method of wireless communication at a receiving device, comprising: receiving, from a transmitting device, at least one portion of a message for a service group, wherein the message comprises a D2D message; measuring a signal strength for the message received from the transmitting device; determining whether the receiving device is within a range of the transmitting device based on the measured signal strength for the message; and determining to send feedback to the transmitting device when the receiving device is within the range of the transmitting device.

In Example 2, the method of Example 1 further includes that the feedback comprises HARQ feedback.

In Example 3, the method of Example 1 or Example 2 further includes that the signal strength measured for the message comprises at least one of an RSSI, an RSRP, or a combination of the RSSI and the RSRP.

In Example 4, the method of any of Examples 1-3 further includes that the signal strength for the message is measured based on at least one of: a control portion of the message; a data portion of the message; or a combination of the control portion of the message and the data portion of the message.

In Example 5, the method of any of Examples 1-4 further includes that the receiving device determines to send the feedback if the signal strength measured for the message meets a threshold.

In Example 6, the method of any of Examples 1-5 further includes transmitting negative HARQ feedback to the transmitting device if the message is not correctly received; or transmitting positive HARQ feedback to the transmitting device if the message is correctly received.

In Example 7, the method of any of Examples 1-6 further includes that if the signal strength measured for the message is below the threshold, the receiving device determines to refrain from sending the feedback.

In Example 8, the method of any of Examples 1-7 further includes that the threshold is based on a quality of service parameter.

In Example 9, the method of any of Examples 1-8 further includes that the threshold is based on an intended range for the message.

In Example 10, the method of any of Examples 1-9 further includes that the threshold is configured at the receiving device.

In Example 11, the method of any of Examples 1-10 further includes receiving a parameter from the transmitting device, wherein the threshold is based at least in part on the parameter.

In Example 12, the method of any of Examples 1-11 further includes that the parameter is comprised in the message.

In Example 13, the method of any of Examples 1-12 further includes that the message further comprises ID information for the service group.

In Example 14, the method of any of Examples 1-13 further includes that the message comprises an IE comprising a hash of a group ID for the service group and the parameter or comprising a first IE comprising a hash of the group ID for the service group and a second IE comprising the parameter.

Example 15 is a device including one or more processors and one or more memories in electronic communication with the one or more processors storing instructions executable by the one or more processors to cause the device to implement a method as in any of Examples 1-14.

Example 16 is a system or apparatus including means for implementing a method or realizing an apparatus as in any of Examples 1-14.

Example 17 is a non-transitory computer readable medium storing instructions executable by one or more processors to cause the one or more processors to implement a method as in any of Examples 1-14.

Example 18 is a method of wireless communication at a transmitting device, comprising: determining an intended range for a service group; transmitting a message for the service group based, at least in part, on the intended range, wherein the message comprises a D2D message; and providing a parameter for a signal strength threshold associated with the service group.

In Example 19, the method of Example 18 further includes that the transmitting device provides the signal strength threshold associated with the service group.

In Example 20, the method of Example 18 or Example 19 further includes that the parameter is comprised in the message.

In Example 21, the method of any of Examples 18-20 further includes that the message further comprises an information element associated with an ID for the service group.

In Example 22, the method of any of Examples 18-22 further includes hashing the group ID with the parameter to generate the information element.

Example 23 is a device including one or more processors and one or more memories in electronic communication with the one or more processors storing instructions executable by the one or more processors to cause the device to implement a method as in any of Examples 18-22.

Example 24 is a system or apparatus including means for implementing a method or realizing an apparatus as in any of Examples 18-22.

Example 25 is a non-transitory computer readable medium storing instructions executable by one or more processors to cause the one or more processors to implement a method as in any of Examples 18-22.

Example 26 is a method of wireless communication at a transmitting device, comprising: transmitting a message to a service group for an intended range, wherein the message comprises a D2D message; receiving HARQ feedback from at least one receiving device; measuring a signal strength for the HARQ feedback; determining whether the HARQ feedback is from a receiving device within the intended range based on the signal strength measured for the HARQ feedback and determining to resend the message when the HARQ feedback is from the receiving device within the intended range.

In Example 27, the method of Example 26 further includes that the signal strength is measured for combined HARQ feedback in a common resource.

In Example 28, the method of Example 26 or Example 27 further includes that the HARQ feedback comprises negative HARQ feedback, wherein the transmitting device determines to resend the message if the signal strength measured for the negative HARQ feedback meets a threshold.

In Example 29, the method of any of Examples 26-28 further includes resending the message for the service group.

In Example 30, the method of any of Examples 26-29 further includes that the transmitting device determines to refrain from resending the message if the signal strength measured for the negative HARQ feedback is below the threshold.

In Example 31, the method of any of Examples 26-30 further includes that the threshold is based on at least one of the intended range for the message, a quality of service for the message, or a combination of the intended range and the quality of service.

In Example 32, the method of any of Examples 26-31 further includes that the signal strength measured for the HARQ feedback comprises at least one of a RSSI, a RSRP, or a combination.

In Example 33, the method of any of Examples 26-32 further includes providing a parameter for a signal strength threshold associated with the service group.

Example 34 is a device including one or more processors and one or more memories in electronic communication with the one or more processors storing instructions executable by the one or more processors to cause the device to implement a method as in any of Examples 26-33.

Example 35 is a system or apparatus including means for implementing a method or realizing an apparatus as in any of Examples 26-33.

Example 36 is a non-transitory computer readable medium storing instructions executable by one or more processors to cause the one or more processors to implement a method as in any of Examples 26-33.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a receiving device, comprising:
   receiving, from a transmitting device, at least a portion of a message for a service group, wherein the message comprises a device-to-device (D2D) message;
   measuring a signal strength for the message;
   determining the receiving device is within a range of the transmitting device based on the measured signal strength for the message; and
   transmitting Hybrid Automatic Repeat Request (HARQ) feedback to the transmitting device for the message that is to the service group in response to the receiving device being within the range of the transmitting device based on the measured signal strength being greater than a threshold.

2. The method of claim 1, wherein the signal strength measured for the message comprises at least one of a Received Signal Strength Indicator (RSSI), a Reference Signal Received Power (RSRP), or a combination of the RSSI and the RSRP.

3. The method of claim 1, wherein the signal strength for the message is measured based on at least one of:
   a control portion of the message;
   a data portion of the message; or a combination of the control portion of the message and the data portion of the message.

4. The method of claim 1, further comprising:
   transmitting negative HARQ feedback to the transmitting device in response to the message not being correctly received; or
   transmitting positive HARQ feedback to the transmitting device in response to the message being correctly received.

5. The method of claim 1, further comprising:
   skipping transmission of the HARQ feedback in response to the signal strength measured for an additional received message being below the threshold.

6. The method of claim 1, wherein the threshold is based on a quality of service parameter.

7. The method of claim 1, wherein the threshold is based on the range for the message.

8. The method of claim 1, wherein the threshold is configured at the receiving device.

9. The method of claim 1, further comprising:
   receiving a parameter from the transmitting device, wherein the threshold is based at least in part on the parameter.

10. The method of claim 9, wherein the parameter is comprised in the message.

11. The method of claim 10, wherein the message further comprises group identifier (ID) information for the service group.

12. The method of claim 11, wherein the message comprises an Information Element (IE) comprising a hash of a group ID for the service group and the parameter or comprising a first IE comprising a hash of the group ID for the service group and a second IE comprising the parameter.

13. The method of claim 1, further comprising:
   receiving a parameter associated with the threshold in a control portion of the message.

14. The method of claim 1, wherein the at least the portion of the message includes:
   a control portion of the message;
   a data portion of the message; or
   a combination of the control portion of the message and the data portion of the message.

15. A method of wireless communication at a transmitting device, comprising:
   determining a range for a service group;
   transmitting a message for the service group based, at least in part, on the range, wherein the message comprises a device-to-device (D2D) message; and
   providing a parameter for a signal strength threshold associated with the service group, wherein Hybrid Automatic Repeat Request (HARQ) feedback to the message is requested from each device in the service group when a measured signal strength of the message is greater than the signal strength threshold.

16. The method of claim 15, wherein the transmitting device provides the parameter associated with the signal strength threshold for the service group in a control portion of the message.

17. The method of claim 15, wherein the parameter is comprised in the message.

18. The method of claim 17, wherein the message further comprises an information element associated with a group identifier (ID) for the service group.

19. The method of claim 18, further comprising:
   hashing the group ID with the parameter to generate the information element.

20. A method of wireless communication at a transmitting device, comprising:
   transmitting a message to a service group for a range, wherein the message comprises a device-to-device (D2D) message;
   receiving Hybrid Automatic Repeat Request (HARQ) feedback from at least one receiving device;
   measuring a signal strength for the HARQ feedback in a common resource that is common to the service group; and
   resending the message based on combined HARQ feedback from the service group having the measured signal strength greater than a threshold.

21. The method of claim 20, wherein the HARQ feedback comprises negative HARQ feedback.

22. The method of claim 21, wherein the transmitting device determines to refrain from resending an additional message in response to the signal strength measured for the negative HARQ feedback for the additional message being below the threshold.

23. The method of claim 21, wherein the threshold is based on at least one of the range for the message, a quality of service for the message, or a combination of the range and the quality of service.

24. The method of claim 20, wherein the signal strength measured for the HARQ feedback comprises at least one of a Received Signal Strength Indicator (RSSI), a Reference Signal Received Power (RSRP), or a combination.

25. The method of claim 20, further comprising:
   providing a parameter for a signal strength threshold associated with the service group in a control portion of the message.

26. An apparatus for wireless communication at a wireless device, comprising:
   one or more memories; and
   one or more processors coupled to the one or more memories, the one or more processors configured to cause the wireless device to:
      receive, from a transmitter device, at least a portion of a message for a service group, wherein the message comprises a device-to-device (D2D) message;
      measure a signal strength for the message from the transmitter device;

determine the wireless device is within a range of the transmitter device based on the measured signal strength for the message; and transmit Hybrid Automatic Repeat Request (HARQ) feedback to the transmitter device for the message that is to the service group in response to the wireless device being within the range of the transmitter device based on the measured signal strength being greater than a threshold.

27. The apparatus of claim 26, wherein the signal strength measured for the message comprises at least one of a Received Signal Strength Indicator (RSSI), a Reference Signal Received Power (RSRP), or a combination of the RSSI and the RSRP.

28. The apparatus of claim 26, wherein the signal strength for the message is measured based on at least one of:
a control portion of the message;
a data portion of the message; or
a combination of the control portion of the message and the data portion of the message.

29. The apparatus of claim 26, wherein the one or more processors are further configured to cause the wireless device to:
transmit negative HARQ feedback to the transmitter device in response to the message not being correctly received; or
transmit positive HARQ feedback to the transmitter device in response to the message being correctly received.

30. The apparatus of claim 26, wherein the one or more processors are configured to cause the wireless device to skip transmitting the HARQ feedback in response to the signal strength measured for an additional received message being below the threshold.

31. The apparatus of claim 26, wherein the threshold is based on a quality of service parameter.

32. The apparatus of claim 26, wherein the threshold is based on the range for the message.

33. The apparatus of claim 26, wherein the threshold is configured at the apparatus.

34. The apparatus of claim 26, wherein the one or more processors are further configured to cause the wireless device to:
receive a parameter from the transmitter device, wherein the threshold is based at least in part on the parameter.

35. The apparatus of claim 34, wherein the parameter is comprised in the message.

36. The apparatus of claim 35, wherein the message further comprises group identifier (ID) information for the service group.

37. The apparatus of claim 36, wherein the message comprises an Information Element (IE) comprising a hash of a group ID for the service group and the parameter or comprising a first IE comprising a hash of the group ID for the service group and a second IE comprising the parameter.

38. The apparatus of claim 26, wherein the one or more processors are further configured to cause the wireless device to:
receive a parameter associated with the threshold in a control portion of the message.

39. The apparatus of claim 26, wherein the at least the portion of the message comprises:
a control portion of the message;
a data portion of the message; or
a combination of the control portion of the message and the data portion of the message.

40. The apparatus of claim 26, wherein the one or more processors are configured, individually or in combination, to cause the wireless device to receive the at least the portion of the message for the service group, measure the signal strength for the message, determine the apparatus is within the range of the transmitter device based on the measured signal strength for the message, and transmit the HARQ feedback.

41. An apparatus for wireless communication at a wireless device, comprising:
one or more memories; and
one or more processors coupled to the one or more memories, the one or more processors configured to cause the wireless device to:
determine a range for a service group;
transmit a message for the service group based, at least in part, on the range, wherein the message comprises a device-to-device (D2D) message; and
provide a parameter for a signal strength threshold associated with the service group, wherein Hybrid Automatic Repeat Request (HARQ) feedback to the message is requested from each device in the service group when a measured signal strength of the message is greater than the signal strength threshold.

42. The apparatus of claim 41, wherein the one or more processors are configured to cause the wireless device to provide the parameter associated with the signal strength threshold for the service group in a control portion of the message.

43. The apparatus of claim 41, wherein the parameter is comprised in the message.

44. The apparatus of claim 43, wherein the message further comprises an information element associated with a group identifier (ID) for the service group.

45. The apparatus of claim 44, wherein the one or more processors are further configured to cause the wireless device to:
hash the group ID with the parameter to generate the information element.

46. The apparatus of claim 41, wherein the one or more processors are configured, individually or in combination, to cause the wireless device to determine the range for the service group, transmit the message for the service group based, and provide the parameter for the signal strength threshold associated with the service group.

47. An apparatus for wireless communication at a wireless device, comprising:
one or more memories; and
one or more processors coupled to the one or more memories, the one or more processors configured to cause the wireless device to:
transmit a message to a service group for a range, wherein the message comprises a device-to-device (D2D) message;
receive Hybrid Automatic Repeat Request (HARQ) feedback from at least one receiver device;
measure a signal strength for the HARQ feedback in a common resource that is common to the service group; and
resend the message based on combined HARQ feedback from the service group having the measured signal strength greater than a threshold.

48. The apparatus of claim 47, wherein the HARQ feedback comprises negative HARQ feedback.

49. The apparatus of claim 48, wherein the one or more processors are configured to cause the wireless device to refrain from resending an additional message in response to the signal strength measured for the negative HARQ feedback for the additional message being below the threshold.

50. The apparatus of claim 48, wherein the threshold is based on at least one of the range for the message, a quality of service for the message, or a combination of the range and the quality of service.

51. The apparatus of claim 47, wherein the signal strength measured for the HARQ feedback comprises at least one of a Received Signal Strength Indicator (RSSI), a Reference Signal Received Power (RSRP), or a combination.

52. The apparatus of claim 47, wherein the one or more processors are further configured to cause the wireless device:
provide a parameter for a signal strength threshold associated with the service group in a control portion of the message.

53. The apparatus of claim 47, wherein the one or more processors are configured, individually or in combination, to cause the wireless device to transmit the message to the service group for the range, receive the HARQ feedback, measure the signal strength for the HARQ feedback, and resend the message based on the combined HARQ feedback from the service group having the measured signal strength greater than the threshold.

54. An apparatus for wireless communication, comprising:
means for receiving, from a transmitter device, at least a portion of a message for a service group, wherein the message comprises a device-to-device (D2D) message;
means for measuring a signal strength for the message from the transmitter device;
means for determining the apparatus is within a range of the transmitter device based on the measured signal strength for the message; and
means for determining to send Hybrid Automatic Repeat Request (HARQ) feedback to the transmitter device for the message that is to the service group in response to the apparatus being within the range of the transmitter device based on the measured signal strength being greater than a threshold.

55. The apparatus of claim 54, wherein the signal strength measured for the message comprises at least one of a Received Signal Strength Indicator (RSSI), a Reference Signal Received Power (RSRP), or a combination of the RSSI and the RSRP.

56. The apparatus of claim 54, wherein the signal strength for the message is measured based on at least one of:
a control portion of the message;
a data portion of the message; or
a combination of the control portion of the message and the data portion of the message.

57. The apparatus of claim 54, further comprising:
means for transmitting negative HARQ feedback to the transmitter device in response to the message not being correctly received; or
means for transmitting positive HARQ feedback to the transmitter device in response to the message being correctly received.

58. The apparatus of claim 54, wherein the means for determining are configured to skip transmitting the HARQ feedback in response to the signal strength measured for an additional message being below the threshold.

59. The apparatus of claim 54, wherein the threshold is based on a quality of service parameter.

60. The apparatus of claim 54, wherein the threshold is based on the range for the message.

61. The apparatus of claim 54, wherein the threshold is configured at the apparatus.

62. The apparatus of claim 54, further comprising:
means for receiving a parameter from the transmitter device, wherein the threshold is based at least in part on the parameter.

63. The apparatus of claim 62, wherein the parameter is comprised in the message.

64. The apparatus of claim 63, wherein the message further comprises group identifier (ID) information for the service group.

65. The apparatus of claim 64, wherein the message comprises an Information Element (IE) comprising a hash of a group ID for the service group and the parameter or comprising a first IE comprising a hash of the group ID for the service group and a second IE comprising the parameter.

66. The apparatus of claim 54, further comprising:
means for receiving a parameter associated with the threshold in a control portion of the message.

67. The apparatus of claim 54, wherein the at least the portion of the message comprises:
a control portion of the message;
a data portion of the message; or
a combination of the control portion of the message and the data portion of the message.

68. An apparatus for wireless communication, comprising:
means for determining a range for a service group;
means for transmitting a message for the service group based, at least in part, on the range, wherein the message comprises a device-to-device (D2D) message; and
means for providing a parameter for a signal strength threshold associated with the service group, wherein Hybrid Automatic Repeat Request (HARQ) feedback to the message is requested from each device in the service group when a measured signal strength of the message is greater than the signal strength threshold.

69. The apparatus of claim 68, wherein the apparatus is configured to provide the parameter associated with the signal strength threshold for the service group in a control portion of the message.

70. The apparatus of claim 68, wherein the parameter is comprised in the message.

71. The apparatus of claim 70, wherein the message further comprises an information element associated with a group identifier (ID) for the service group.

72. The apparatus of claim 71, further comprising:
means for hashing the group ID with the parameter to generate the information element.

73. An apparatus for wireless communication, comprising:
means for transmitting a message to a service group for a range, wherein the message comprises a device-to-device (D2D) message;
means for receiving Hybrid Automatic Repeat Request (HARQ) feedback from at least one receiver device;
means for measuring a signal strength for the HARQ feedback in a common resource that is common to the service group; and
means for resending the message based on combined HARQ feedback from the service group having the measured signal strength greater than a threshold.

74. The apparatus of claim 73, wherein the HARQ feedback comprises negative HARQ feedback.

75. The apparatus of claim 74, wherein the means for resending are configured to refrain from resending an additional message in response to the signal strength measured for the negative HARQ feedback for the additional message being below the threshold.

76. The apparatus of claim 74, wherein the threshold is based on at least one of the range for the message, a quality of service for the message, or a combination of the range and the quality of service.

77. The apparatus of claim 73, wherein the measured signal strength for the HARQ feedback comprises at least one of a Received Signal Strength Indicator (RSSI), a Reference Signal Received Power (RSRP), or a combination.

78. The apparatus of claim 73, further comprising:
means for providing a parameter for a signal strength threshold associated with the service group in a control portion of the message.

79. A non-transitory computer-readable medium storing computer executable code for wireless communication at a receiver device, the code when executed by one or more processors cause the receiver device to:
receive, from a transmitter device, at least a portion of a message for a service group, wherein the message comprises a device-to-device (D2D) message;
measure a signal strength for the message from the transmitter device;
determine the receiver device is within a range of the transmitter device based on the measured signal strength for the message; and
transmit Hybrid Automatic Repeat Request (HARQ) feedback to the transmitter device for the message that is for the service group in response to the receiver device being within the range of the transmitter device based on the measured signal strength being greater than a threshold.

80. The non-transitory computer-readable medium of claim 79, wherein the signal strength measured for the message comprises at least one of a Received Signal Strength Indicator (RSSI), a Reference Signal Received Power (RSRP), or a combination of the RSSI and the RSRP.

81. The non-transitory computer-readable medium of claim 79, wherein the signal strength for the message is based on at least one of:
a control portion of the message;
a data portion of the message; or a combination of the control portion of the message and the data portion of the message.

82. The non-transitory computer-readable medium of claim 79, wherein the code when executed by the one or more processors further causes the receiver device to:
skip transmitting the HARQ feedback in response to the signal strength measured for an additional message being below the threshold.

83. The non-transitory computer-readable medium of claim 79, wherein the at least the portion of the message comprises:
a control portion of the message;
a data portion of the message; or
a combination of the control portion of the message and the data portion of the message.

84. A non-transitory computer-readable medium storing computer executable code for wireless communication at a transmitter device, the code when executed by one or more processors cause the transmitter device to:
determine a range for a service group;
transmit a message for the service group based, at least in part, on the range, wherein the message comprises a device-to-device (D2D) message; and
provide a parameter for a signal strength threshold associated with the service group, wherein Hybrid Automatic Repeat Request (HARQ) feedback to the message is requested from each device in the service group when a measured signal strength of the message is greater than the signal strength threshold.

85. The non-transitory computer-readable medium of claim 84, wherein the code when executed by the one or more processors further causes the transmitter device to provide the parameter associated with the signal strength threshold for the service group in a control portion of the message.

86. The non-transitory computer-readable medium of claim 84, wherein the message further comprises an information element associated with a group identifier (ID) for the service group.

87. The non-transitory computer-readable medium of claim 84, wherein the measured signal strength for the HARQ feedback comprises at least one of a Received Signal Strength Indicator (RSSI), a Reference Signal Received Power (RSRP), or a combination.

88. A non-transitory computer-readable medium storing computer executable code for wireless communication at a transmitter device, the code when executed by one or more processors cause the transmitter device to:
transmit a message to a service group for a range, wherein the message comprises a device- to-device (D2D) message;
receive Hybrid Automatic Repeat Request (HARQ) feedback from at least one receiver device;
measure a signal strength for the HARQ feedback in a common resource that is common to the service group; and
resend the message based on combined HARQ feedback from the service group having the measured signal strength greater than a threshold.

89. The non-transitory computer-readable medium of claim 88, wherein the HARQ feedback comprises negative HARQ feedback, and the code when executed by the one or more processors further causes the transmitter device to refrain from resending an additional message in response to the measured signal strength for the negative HARQ feedback for the additional message being below the threshold.

90. The non-transitory computer-readable medium of claim 89, wherein the threshold is based on at least one of the range for the message, a quality of service for the message, or a combination of the range and the quality of service.

* * * * *